(12) United States Patent
Cheng

(10) Patent No.: US 10,735,295 B2
(45) Date of Patent: Aug. 4, 2020

(54) DATA TRANSMISSION METHOD AND APPARATUS

(71) Applicant: Alibaba Group Holding Limited, Grand Cayman (KY)

(72) Inventor: Feng Cheng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 218 days.

(21) Appl. No.: 15/959,047

(22) Filed: Apr. 20, 2018

(65) Prior Publication Data

US 2018/0241658 A1   Aug. 23, 2018

Related U.S. Application Data

(63) Continuation of application No. PCT/CN2016/101981, filed on Oct. 13, 2016.

(30) Foreign Application Priority Data

Oct. 22, 2015 (CN) .......................... 2015 1 0696508

(51) Int. Cl.
*H04L 12/26* (2006.01)
*H04L 29/08* (2006.01)
(Continued)

(52) U.S. Cl.
CPC ............ *H04L 43/106* (2013.01); *H04L 29/08* (2013.01); *H04L 67/1095* (2013.01);
(Continued)

(58) Field of Classification Search
None
See application file for complete search history.

(56) References Cited

U.S. PATENT DOCUMENTS 6,701,329 B1 * 3/2004 Esibov .............. H04L 29/12066
7,500,020 B1 * 3/2009 Kabra .................... G06F 16/176
709/248

(Continued)

FOREIGN PATENT DOCUMENTS

CN      101867605 A      10/2010
CN      103812849           5/2014
(Continued)

OTHER PUBLICATIONS

Translation of International Search Report from corresponding PCT application No. PCT/CN2016/101981 dated Dec. 28, 2016, 2 pages.
(Continued)

*Primary Examiner* — Thomas J Dailey
(74) *Attorney, Agent, or Firm* — Lee & Hayes, P.C.

(57) ABSTRACT

A method including receiving, by a first device, a request message from a second device regularly, wherein the request message carries a timestamp corresponding to the request message currently received; determining, by the first device, whether the value of the timestamp is less than a preset threshold; and synchronizing, by the first device according to a corresponding relationship between timestamps and fragmented data locally cached by the first device, the fragmented data corresponding to the timestamp to the second device when the value of the timestamp is less than the preset threshold, wherein the fragmented data is obtained by fragmenting the full amount of data recorded by the first device. The present disclosure solves the technical problem of frequent failure during full-amount data updating between systems.

16 Claims, 15 Drawing Sheets

(51) Int. Cl.
*H04W 56/00* (2009.01)
*H04L 29/12* (2006.01)

(52) U.S. Cl.
CPC ....... *H04L 67/2842* (2013.01); *H04W 56/001* (2013.01); *H04L 61/1511* (2013.01)

(56) References Cited

U.S. PATENT DOCUMENTS

| | | | | |
|---|---|---|---|---|
| 8,751,445 | B2* | 6/2014 | Takeuchi | G06F 16/275 707/624 |
| 9,444,781 | B2* | 9/2016 | Ulevitch | H04L 29/12066 |
| 2007/0208918 | A1 | 9/2007 | Harbin et al. | |
| 2009/0282096 | A1* | 11/2009 | Kamrowski | H04L 67/16 709/203 |
| 2009/0282169 | A1* | 11/2009 | Kumar | H04L 67/1095 709/248 |
| 2015/0006485 | A1* | 1/2015 | Christiansen | G06F 16/219 707/625 |
| 2015/0207844 | A1 | 7/2015 | Tataroiu | |
| 2015/0207899 | A1 | 7/2015 | Yoshikawa et al. | |
| 2017/0339222 | A1* | 11/2017 | Newton | H04L 67/1036 |

FOREIGN PATENT DOCUMENTS

| | | |
|---|---|---|
| CN | 104506643 | 4/2015 |
| CN | 104967640 | 10/2015 |

OTHER PUBLICATIONS

Translation of Written Opinion from corresponding PCT application No. PCT/CN2016/101981 dated Dec. 28, 2016, 6 pages.
Translation of CN Office Action from Corresponding CN Application No. 201510696508.4 dated Sep. 17, 2019, a counterpart foreign application for U.S. Appl. No. 15/959,047, 6 pages.
The Chinese Search Report dated Sep. 8, 2019 for PCT Application No. 2015106965084, 1 page.
The Extended European Search Report dated Jun. 18, 2019, for European Patent Application No. 16856846.7, 3 pages.

* cited by examiner

DATA TRANSMISSION METHOD AND APPARATUS

CROSS REFERENCE TO RELATED PATENT APPLICATIONS

This application claims priority to and is a continuation of PCT Patent Application No. PCT/CN2016/101981, filed on 13 Oct. 2016, which claims priority to Chinese Patent Application No. 201510696508.4 filed on 22 Oct. 2015 and entitled "DATA TRANSMISSION METHOD AND APPARATUS", which are incorporated herein by reference in their entirety.

TECHNICAL FIELD

The present disclosure relates to the field of Internet technologies, and, more particularly, to data transmission methods and apparatuses.

BACKGROUND

In the related art, a network content monitoring system generally includes two systems (which may be manifested as two devices), for example, a system A and a system B. The system B needs to synchronize data in the system A. In the related art, all data information needs to be synchronized during each synchronization, and this may lead to timeout of reading of a database. Alternatively, updating of full-amount data from the system A to the system B may fail frequently when the system A and the system B are located in different network environments, the full-amount data provided by the system A is too large, and the memory of the system B is used excessively.

At present, no effective solution has been put forward to solve the foregoing problems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The example embodiments of the present disclosure provide a data transmission method and apparatus, to at least solve the technical problem of frequent failure during full-amount data updating between systems.

According to an aspect of the example embodiments of the present disclosure, a data transmission method is provided, including: receiving, by a first device, a request message from a second device regularly, wherein the request message carries a timestamp corresponding to the request message that is currently received; determining, by the first device, whether the value of the timestamp is less than a preset threshold; and synchronizing, by the first device according to a corresponding relationship between timestamps and fragmented data locally cached by the first device, the fragmented data corresponding to the timestamp to the second device when the value of the timestamp is less than the preset threshold, wherein the fragmented data is obtained by fragmenting the full amount of data recorded by the first device.

According to another aspect of the example embodiments of the present disclosure, a data transmission method is further provided, including: sending, by a second device, a request message to a first device, wherein the request message carries a timestamp corresponding to the request message; and receiving, by the second device, fragmented data sent by the first device when the value of the timestamp is less than a preset threshold, wherein the fragmented data is fragmented data which corresponds to the timestamp and is locally cached in the first device, and the fragmented data is obtained by fragmenting the full amount of data recorded by the first device.

According to another aspect of the example embodiments of the present disclosure, a data transmission apparatus is further provided. The data transmission apparatus is applied to a first device and includes: a receiving module configured to receive a request message from a second device regularly, wherein the request message carries a timestamp corresponding to the request message currently received; a first determining module configured to determine whether the value of the timestamp is less than a preset threshold; and a first synchronization module configured to synchronize, according to a corresponding relationship between timestamps and fragmented data locally cached by the first device, the fragmented data corresponding to the timestamp to the second device when the value of the timestamp is less than the preset threshold, wherein the fragmented data is obtained by fragmenting the full amount of data recorded by the first device.

According to another aspect of the example embodiments of the present disclosure, a data transmission apparatus is further provided. The data transmission apparatus is applied to a second device and includes: a sending module configured to send a request message to a first device, wherein the request message carries a timestamp corresponding to the request message; and a first receiving module configured to receive fragmented data sent by the first device when the value of the timestamp is less than a preset threshold, wherein the fragmented data is fragmented data which corresponds to the timestamp and is locally cached in the first device, and the fragmented data is obtained by fragmenting the full amount of data recorded by the first device.

In the example embodiments of the present disclosure, fragmented data locally cached by a first device which corresponds to a timestamp is synchronized to a second device by using the first device, wherein the fragmented data is obtained by fragmenting the full amount of data recorded by the first device, that is, by caching and fragmenting the full amount of data, and then according to a timestamp in a received request message, fragmented data in a cache which corresponds to the timestamp is synchronized to the second device sequentially. As a result, the pressure of data reading is reduced, the technical problem of frequent failure during full-amount data updating between systems is solved, and the efficiency of data transmission is improved.

BRIEF DESCRIPTION OF THE DRAWINGS

The accompanying drawings described here are used to provide further understanding about the present invention and constitute a part of the present application. Example embodiments of the present invention and illustration thereof are to be used to explain the present invention, and are not to pose any improper limitation to the present invention. In the drawings.

DETAILED DESCRIPTION

Figure 1:
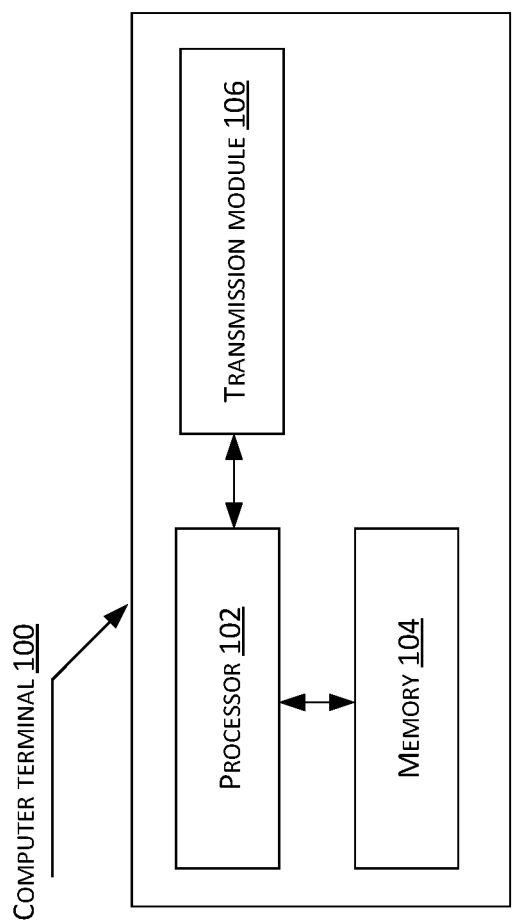
FIG. 1 is a structural block diagram of hardware of a computer terminal that implements a data transmission method according to an example embodiment of the present disclosure.

In order to enable those skilled in the art better understand the solution of the present invention, the technical solutions in the example embodiments of the present invention will be clearly and completely described below with reference to the accompanying drawings in the example embodiments of the present invention. It is apparent that the example embodiments described are only a part rather than all the example embodiments of the present invention. All other example embodiments derived by those of ordinary skill in the art based on the example embodiments of the present invention without creative efforts should fall within the protection scope of the present invention.

It should be noted that the terms "first", "second", and so on in the specification, the claims and the drawings of the present disclosure are used to distinguish similar objects, and not necessarily to describe a particular order or sequence. It should be understood that data used in such a way may be interchanged under appropriate circumstances, so that the example embodiments of the present disclosure described here could be implemented in an order other than that illustrated or described here. In addition, the terms "comprise/include" and "have" as well as their any variations are intended to cover non-exclusive inclusion. For example, a process, method, system, product or device including a series of steps or units need not be limited to the steps or units clearly listed, and may include other steps or units not clearly listed or inherent to the process, method, system, product or device.

In the related art, data transmission between devices in the field of network content monitoring and shielding includes the following main steps:

1. Upon startup, a second device reads a uniform resource locator (URL)/domain name denial record from a first device for the first time.

2. The URL/domain name denial record is read by updating the full amount of data, and a request sent by the second device may carry a timestamp parameter whose value is 0.

3. The first device will read out all URL/domain name denial records in a current database upon receipt of the request carrying the timestamp parameter whose value is 0, add a current time value (accurate to minute) to the URL/domain name denial records, and return the URL/domain name denial records together with the current time value to the second device.

4. The second device clears all the denial records in the system upon receipt of the full amount of URL/domain name denial records, and uses the received full amount of URL/domain name denial records instead.

5. One minute later, the second device determines whether the current time is an hour or half an hour. If yes, 2 is performed. If no, a request is sent to the first device, in which a timestamp parameter is carried whose value is the time value returned by the first device in 3.

6. The first device will read out data changed from the timestamp-specified time to the current time from a database upon receipt of the request carrying the timestamp parameter whose value is not 0, add a current time value (accurate to minute) to the data, and return the data together with the current time value to the second device.

7. The second device updates all the denial records in the system upon receipt of incremental URL/domain name denial records, and then 5 is performed.

When the magnitude of URL/domain name denial data of the first device reaches a level of ten millions, the following problems may occur. Timeout of reading of a database is caused when the first device reads the full amount of the URL/domain name denial data from the database in real time. A network link is unstable when the first device and the second device are located in different network environments. The full amount of URL/domain name denial records at the level of ten millions will prolong the data transmission time, and may often lead to failure in transmission of the full amount of data. The memory of a server of the second device is limited, and when a large proportion of the memory has been used, swap in and swap out of the full amount of URL/domain name denial records often causes the memory to raise an alarm.

To facilitate understanding of the present disclosure, the terms involved in the example embodiments of the present disclosure are briefly explained below:

Incremental synchronization: a system A maintains a batch of data that changes in real time, and a system B needs to use this batch of data maintained by the system A. When the system B accesses the system A to read data, the system A only sends a variation of the data between the previous access of the system B and this access to the system B. Such a data synchronization manner is referred to as incremental synchronization.

Full-amount synchronization: a system A maintains a batch of data that changes in real time, and a system B needs to use this batch of data maintained by the system A. When the system B accesses the system A to read data, the system A sends all the current data to the system B. Such a data synchronization manner is referred to as full-amount synchronization.

In the example embodiments of the present disclosure, the full-amount updating of denial records between the first device and the second device is optimized, and incremental synchronization is adopted to simulate full-amount synchronization to avoid the above problems. Detailed description is provided below in combination with specific example embodiments.

Example Embodiment 1

According to the example embodiments of the present disclosure, an example embodiment of a data transmission method is further provided. It should be noted that the steps shown in the flowcharts of the drawings may be performed in, for example, a computer system including a set of computer executable instructions. Moreover, although a logical order is shown in the flowcharts, in some cases, the steps shown or described may be performed in an order different from that described here.

The method example embodiment provided in Example embodiment 1 of the present application may be performed in a mobile terminal, a computer terminal, or a similar arithmetic device. By taking running the method on a computer terminal as an example, FIG. 1 is a structural block diagram of hardware of a computer terminal that implements a data transmission method according to an example embodiment of the present disclosure. As shown in FIG. 1, the computer terminal 100 may include one or more (only one is shown in the figure) processors 102 (the processor 102 may include, but is not limited to, a processing apparatus such as a microprogrammed control unit (MCU) or a programmable logic device (FPGA)), a memory 104 configured to store data, and a transmission module 106 configured for a communication function. Those of ordinary skill in the art may understand that FIG. 1 merely shows a schematic structure which does not limit the structure of the electronic device. For example, the computer terminal 100 may also include more or fewer components than those shown in FIG. 1 or have a configuration different from that shown in FIG. 1.

The memory 104 may be configured to store a software program and module of application software, such as a program instruction/module corresponding to the data transmission method in the example embodiment of the present disclosure. The processor 102 executes various functional applications and performs data processing by running the software program and module stored in the memory 104, thereby implementing the data transmission method of the application program. The memory 104 may include a high-speed random memory, and may also include a nonvolatile memory, for example, one or more magnetic storage devices, flash memories or other nonvolatile solid-state memories. In some example embodiments, the memory 104 may further include memories remotely disposed relative to the processor 102, and these remote memories may be connected to the computer terminal 100 through a network. Examples of the network include, but are not limited to, the Internet, an intranet, a local area network, a mobile communications network, or a combination thereof.

The transmission module 106 is configured to receive or send data via a network. In a specific example, the network may include a wireless network provided by a communication provider of the computer terminal 100. In an example, the transmission module 106 includes a network interface controller (NIC), which may be connected to another network device via a base station to be capable of communicating with the Internet. In an example, the transmission module 106 may be a radio frequency (RF) module configured to communicate with the Internet wirelessly.

Figure 2:
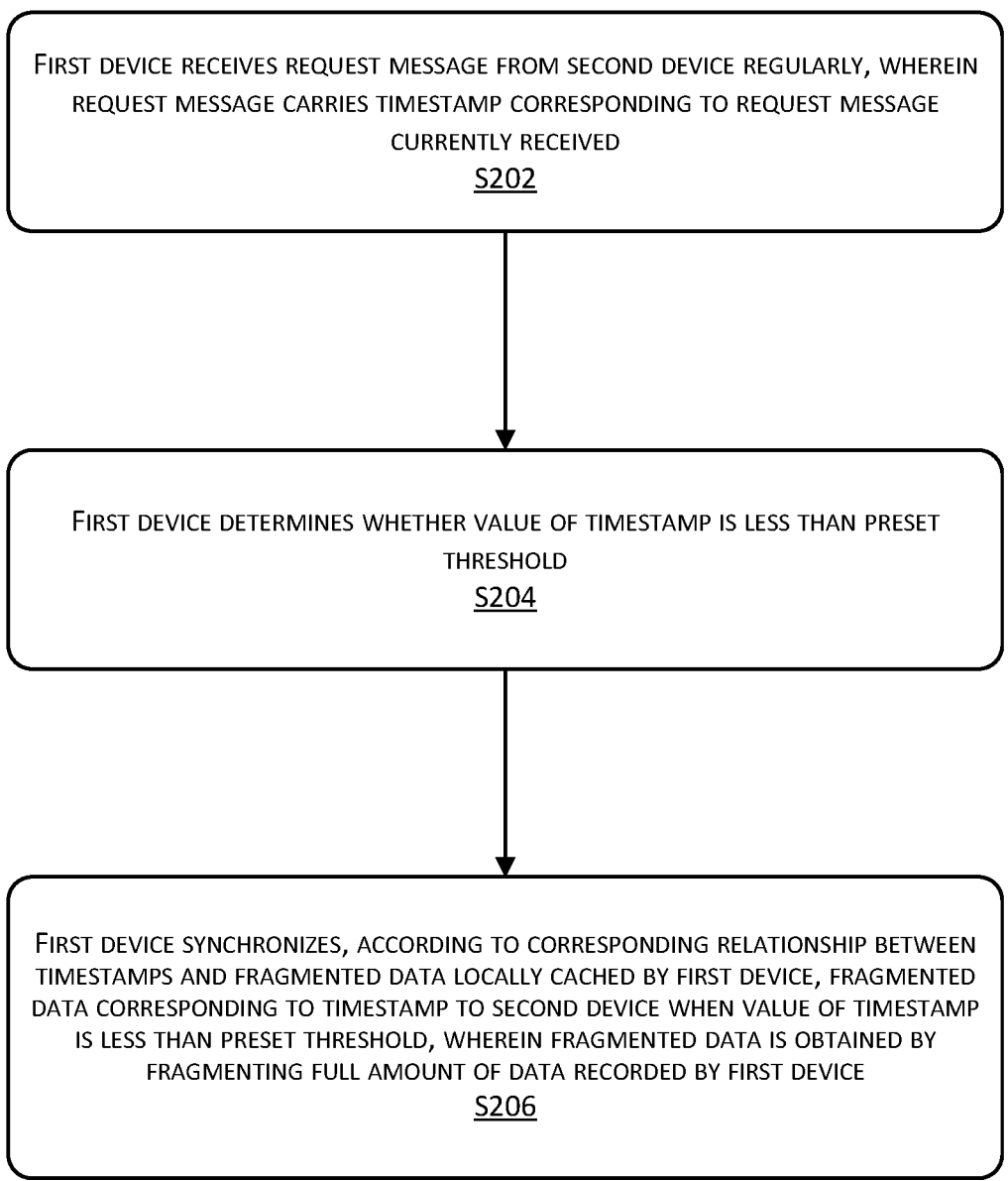
FIG. 2 is a first flowchart of a data transmission method according to Example embodiment 1 of the present disclosure.

The present application provides a data transmission method as shown in FIG. 2 in the above running environment. FIG. 2 is a first flowchart of a data transmission method according to Example embodiment 1 of the present disclosure. As shown in FIG. 2, the method includes the following steps.

Step S202. A first device receives a request message from a second device regularly, wherein the request message carries a timestamp corresponding to the request message currently received.

Optionally, the first device may be the computer terminal 100 in the above running environment, and the function of the first device is implemented by using the computer terminal 100 to achieve the data transmission method in this example embodiment.

It should be noted that the term "regularly" in the step of receiving a request message from a second device regularly may be set according to an actual situation. A time interval between any two received request messages may be fixed. For example, the request message is set to be received once every minute. The request message may also be received at an unfixed time interval. For example, a request message is received for the second time one minute later, and a request message is received for the third time three minutes later. The specific time interval may be set according to actual situations.

Step S204. The first device determines whether the value of the timestamp is less than a preset threshold.

It should be noted that the first device and the second device may be manifested as two physical entities, and may also be manifested as two applications, but are not limited to this. The value of the timestamp may be a simple serial number such as an Arabic numeral, and may also be a time value, but is not limited to this.

The value of the timestamp may be a specified value, for indicating reading of the full amount of data in the first device. In an optional example embodiment, the specified value may be 0. That is, it is indicated that the second device should read the full amount of data in the first device when the value of the timestamp carried in the request message is 0.

In an optional example embodiment, before step S204, it is necessary to determine whether the value of the timestamp is the specified value, and synchronization of fragmented data corresponding to the timestamp to the second device is triggered when the determining result is yes. The first device may be triggered to start to synchronize a first piece of fragmented data in the full amount of data to the second device when the value of the timestamp is the specified value.

Step S206. The first device synchronizes, according to a corresponding relationship between timestamps and fragmented data locally cached by the first device, the fragmented data corresponding to the timestamp to the second device when the value of the timestamp is less than the preset threshold, wherein the fragmented data is obtained by fragmenting the full amount of data recorded by the first device.

It should be noted that the preset threshold may be the number of fragments obtained after the full amount of data is fragmented, and definitely may also be another value. Generally, the preset threshold may be set to be less than 10. The full amount of data may be denial records for a uniform resource locator (URL), may also be denial records for a domain name, and may also be a combination of them, but is not limited to this.

The fragmented data may be obtained from the first device in the following manner: writing fragmented data in a database of the first device corresponding to a first index n into the local cache, and taking n−1 as an index of the fragmented data in the local cache of the first device, wherein n is less than or equal to the total number N of all pieces of the fragmented data obtained after the full amount of data is fragmented, and n and N are both positive integers. In an optional example embodiment, the step of writing fragmented data in a database of the first device corresponding to a first index n into the local cache, and taking n−1 as an index of the fragmented data in the local cache of the first device, for example, includes: determining, by the first device, whether n is less than N; reading, by the first device, the fragmented data corresponding to n from the database when n is less than N, and attaching a timestamp whose value is n to the fragmented data corresponding to n; reading, by the first device, the fragmented data corresponding to n from the database when n is equal to N, and attaching a timestamp whose value is a specified moment to the fragmented data corresponding to n, wherein the specified moment is the moment when the second device accessed the first device the last time; and writing, by the first device, the fragmented data corresponding to n into the local cache, and taking n−1 as an index of the fragmented data in the local cache.

It should be noted that the caching manner may be caching the data by fragmentation according to a sending format. Thus, when the second device needs to read the data, the first device does not need to convert the format of the fragmented data, but directly returns the data to the second device, which reduces the time of synchronization and increases the efficiency of synchronization.

After the full amount of data in the first device is fragmented and then cached in a local cache of the first device, each piece of fragmented data cached in the cache has a corresponding index. The index has a corresponding relationship with the timestamp in the request message sent by the second device. Fragmented data obtained by fragmenting the full amount of data is synchronized to the second device according to the corresponding relationship between the timestamp and the fragmented data in the cache. In an optional example embodiment of the present disclosure, the synchronizing the fragmented data corresponding to the timestamp to the second device in step S206 may be manifested as: synchronizing, by the first device with the value of the timestamp as an index, specified fragmented data in a local cache of the first device corresponding to the index to the second device.

Through the above steps, the full amount of data is cached by fragmentation, and then according to a timestamp in a received request message, fragmented data corresponding to the timestamp in a cache is synchronized to the second device sequentially based on a relationship between the timestamp and the fragmented data in the cache. As a result, the pressure of data reading is reduced, the technical problem of frequent failure during full-amount data updating between systems is solved, and the efficiency of data transmission is improved.

For example, data records at a level of ten millions are usually recorded in a database of the first device. Here, for ease of understanding, by taking fewer data records (80 data records) as an example, after the first device receives a request message that carries a timestamp whose value is 0, the first device synchronizes the 80 records to the second device all at once according to the manner in the related art. In this example embodiment, the first device fragments the 80 records, and the records may be fragmented in a manner of equal distribution or unequal distribution. By taking equal distribution as an example, the 80 records are fragmented into 4 parts, and each fragment has 20 records. The data included in each fragment is written into the cache, and indexes corresponding to the 4 pieces of fragmented data in the cache are set to 0, 1, 2, and 3. When the second device requests reading of the full amount of data in the first device, a timestamp carried in a first request is 0, and then the first device synchronizes fragmented data in the cache that takes 0 as an index to the second device. After a period of time (for example, 1 minute), the first device receives a second request. A timestamp carried in the second request is 1, and then the first device synchronizes fragmented data in the cache that takes 1 as an index to the second device. The rest may be done in the same manner, till the fragmented data in the cache has been completely read. That is, in this example embodiment, the full amount of data is fragmented, and the fragmented data is synchronized to the second device sequentially, i.e., the full amount of data is synchronized to the second device in batches, which, compared with the solution in the related art, may reduce the pressure of data reading, shorten the time of data transmission, and improve the efficiency of data transmission.

Figure 3:
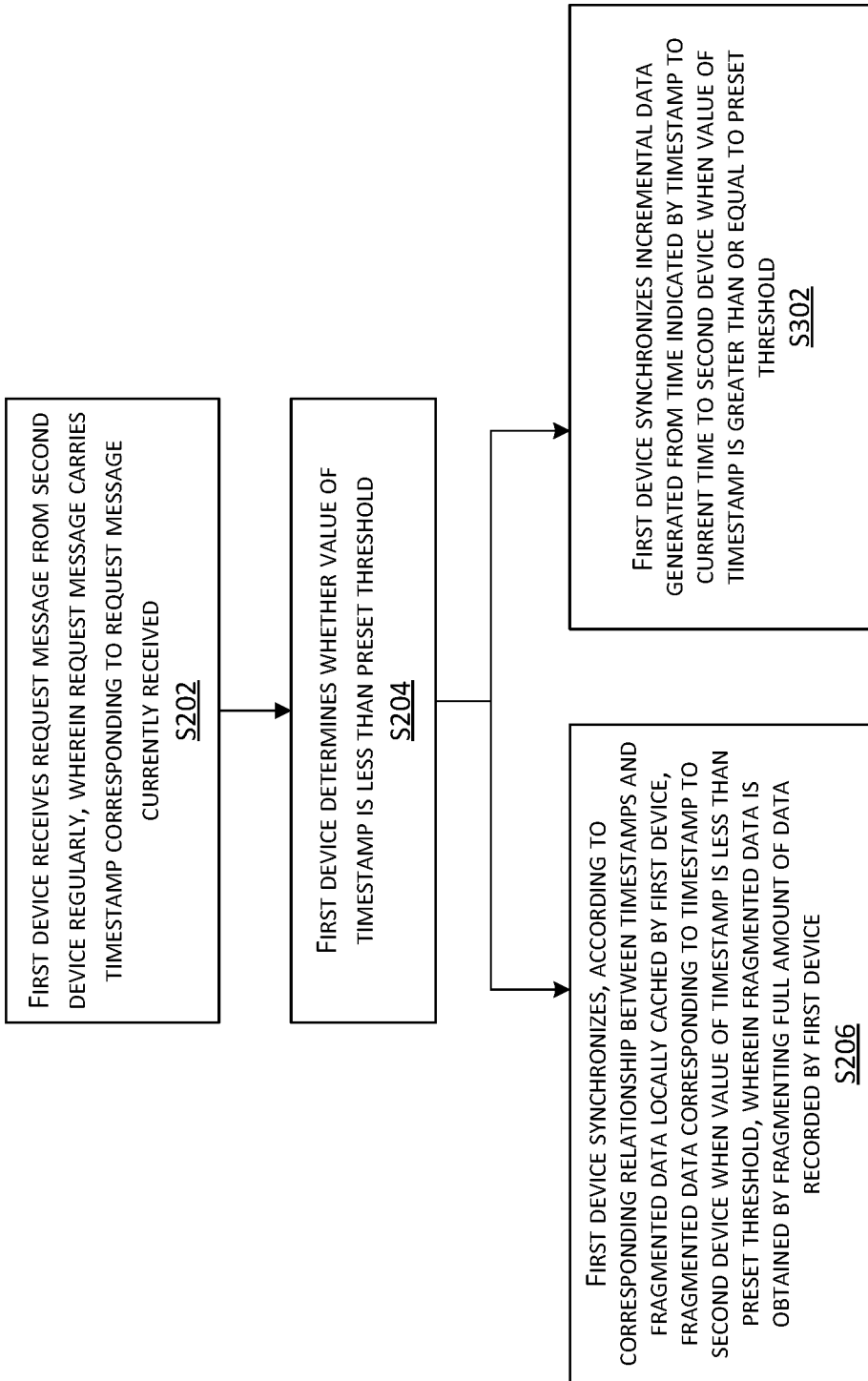
FIG. 3 is a second flowchart of the data transmission method according to Example embodiment 1 of the present disclosure.

In an optional example embodiment, FIG. 3 is a second flowchart of the data transmission method according to Example embodiment 1 of the present disclosure. As shown in FIG. 3, in addition to the steps as shown in FIG. 2, the method further includes:

Step S302. The first device synchronizes incremental data generated from the time indicated by the timestamp to the current time to the second device when the value of the timestamp is greater than or equal to the preset threshold.

It should be noted that there are two types of timestamps in the example embodiment of the present disclosure. The first-type timestamp may be the timestamp in the example embodiment shown in FIG. 2, and the timestamp may play a role of index identifier for reading fragmented data in the full amount of data, which may be represented with a single-digit number such as 0, 1, or 2. The second-type timestamp may be a real timestamp, which represents a real time, that is, the time when the second device accesses the first device the last time, and may be represented with a 9-digit number. That is, the second-type timestamp may play a role of identifier and may also represent a real time. As the preset threshold is generally fragmented data, which may not be a large number, the value of the second-type timestamp, which is a real timestamp that may be represented with a 9-digit number, is generally greater than the preset threshold (that is, the timestamp equal to or less than the preset threshold in step S302). Thus, the second-type timestamp may be used as an identifier of the end of one reading of the full amount of data, or an identifier for triggering normal reading of incremental data.

It should be noted that, in step S302, the value of the timestamp is greater than or equal to the preset threshold, indicating that the request sent by the second device is a normal request for reading incremental data, and in this case, incremental data generated from a moment when the second device accesses the first device the last time (i.e., the time indicated by the timestamp) to the current time needs to be transmitted to the second device. In the following time, the first device synchronizes the incremental data to the second device always by means of normal incremental synchronization, till the time point is an hour or half an hour, that is, till an indication that the first device synchronizes the data to the second device by means of full-amount synchronization is received, and so on.

It should be noted that, in the example embodiment of the present disclosure, data communication between the first device and the second device may use an http protocol but is not limited to this. The method may be applied to the field of network content monitoring and shielding. For example, the first device monitors network content such as content related to pornography, gambling, violence, and terrorism, or another device monitors the content. After the content is monitored, a URL of a webpage corresponding to the content or a domain name of a computer where the content occurs is recorded, and then the data is synchronized to the second device with the method of the example embodiment of the present disclosure. The second device may transmit the data to another device or the second device shields the content according to the obtained URL or domain name.

To better understand the present disclosure, the present disclosure is further explained in the following in combination with optional example embodiments.

Figure 4:
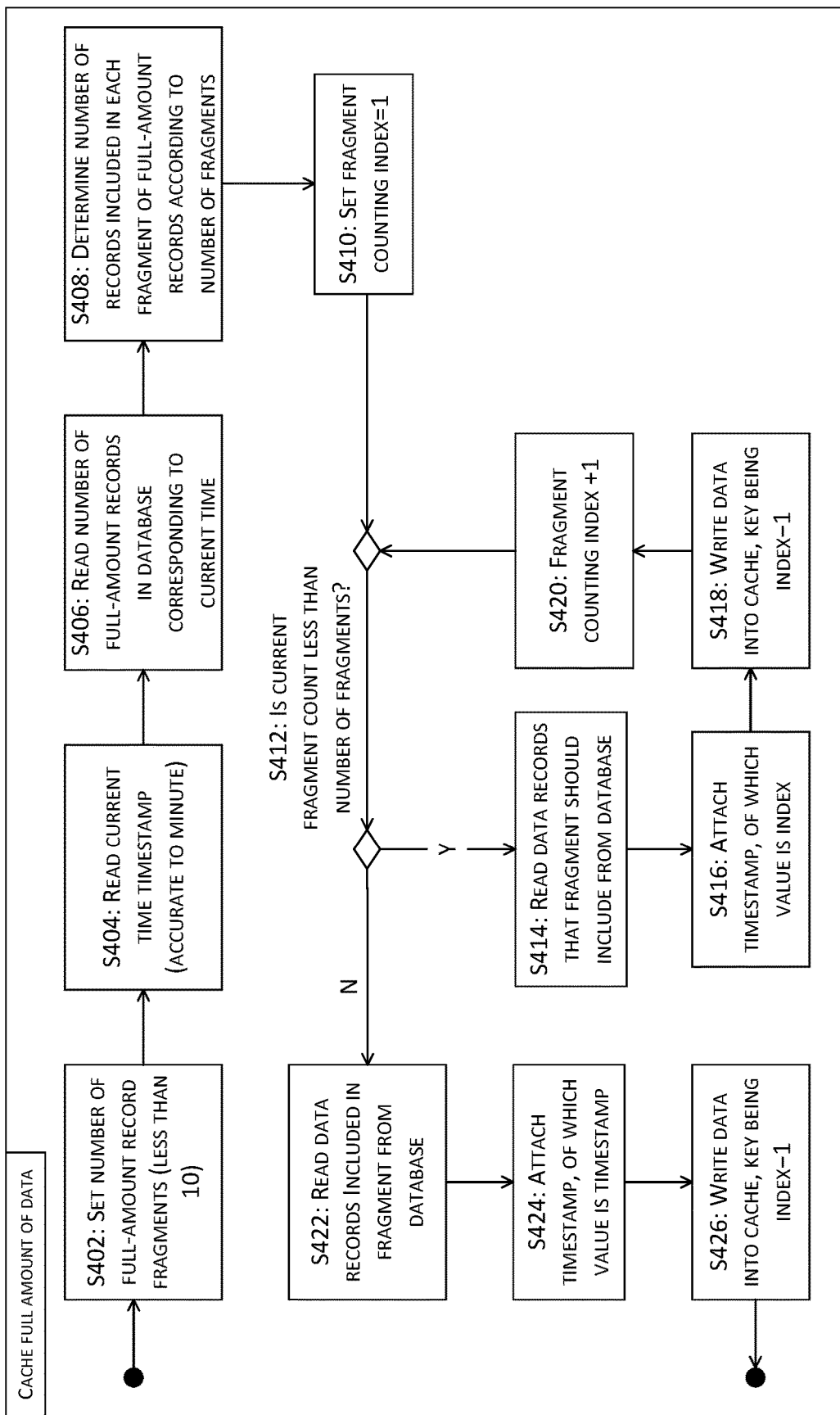
FIG. 4 is a schematic flowchart of fragmenting and caching the full amount of data by a first device according to an optional example embodiment of the present disclosure.

In an optional example embodiment, the first device fragments and caches full-amount URLs/domain names in a database of the first device every 30 minutes, to solve the problems such as timeout of reading caused when records are read in real time from the database in the full amount. FIG. 4 is a schematic flowchart of fragmenting and caching the full amount of data by a first device according to an optional example embodiment of the present disclosure. As shown in FIG. 4, the following steps are included.

Step S402. The number of fragments (e.g., 4) of the full-amount URL/domain name denial records is set, and the number of fragments is less than 10.

Step S404. The current time is read, which is accurate to minute, and is recorded in a timestamp.

Step S406. The number of full-amount records (e.g., 81) in a database corresponding tot the current time is read according to the value of the timestamp.

Step S408. The number of records (e.g., 20, 20, 20, 21) included in each fragment of the full-amount records is calculated according to the number of the fragments.

Step S410. A fragment counting index (i.e., the first index n in the foregoing example embodiment) is set, of which the value is 1.

Step S412. Whether the current index value is less than the number of fragments (equivalent to the total number N of the pieces of fragmented data in the foregoing example embodiment) is determined, step S414 is performed if a result is yes (e.g., 1), and step S422 is performed if a result is no (e.g., 4).

Step S414. Data included in a specified fragment corresponding to the index is read from the database.

Step S416. A timestamp is attached, of which the value is index.

Step S418. The fragmented data and the timestamp are written into a cache, and the key value is index-1 (equivalent to n−1 in the foregoing example embodiment).

Step S420. The fragment counting index is increased by 1, and the procedure returns to perform step S412.

Step S422. Data included in a specified fragment corresponding to the index is read from the database.

Step S424. A timestamp is attached, of which the value is timestamp (equivalent to the specified moment in the foregoing example embodiment).

Step S426. The fragmented data and the timestamp are written into a cache, and the key value is index−1.

Figure 5:
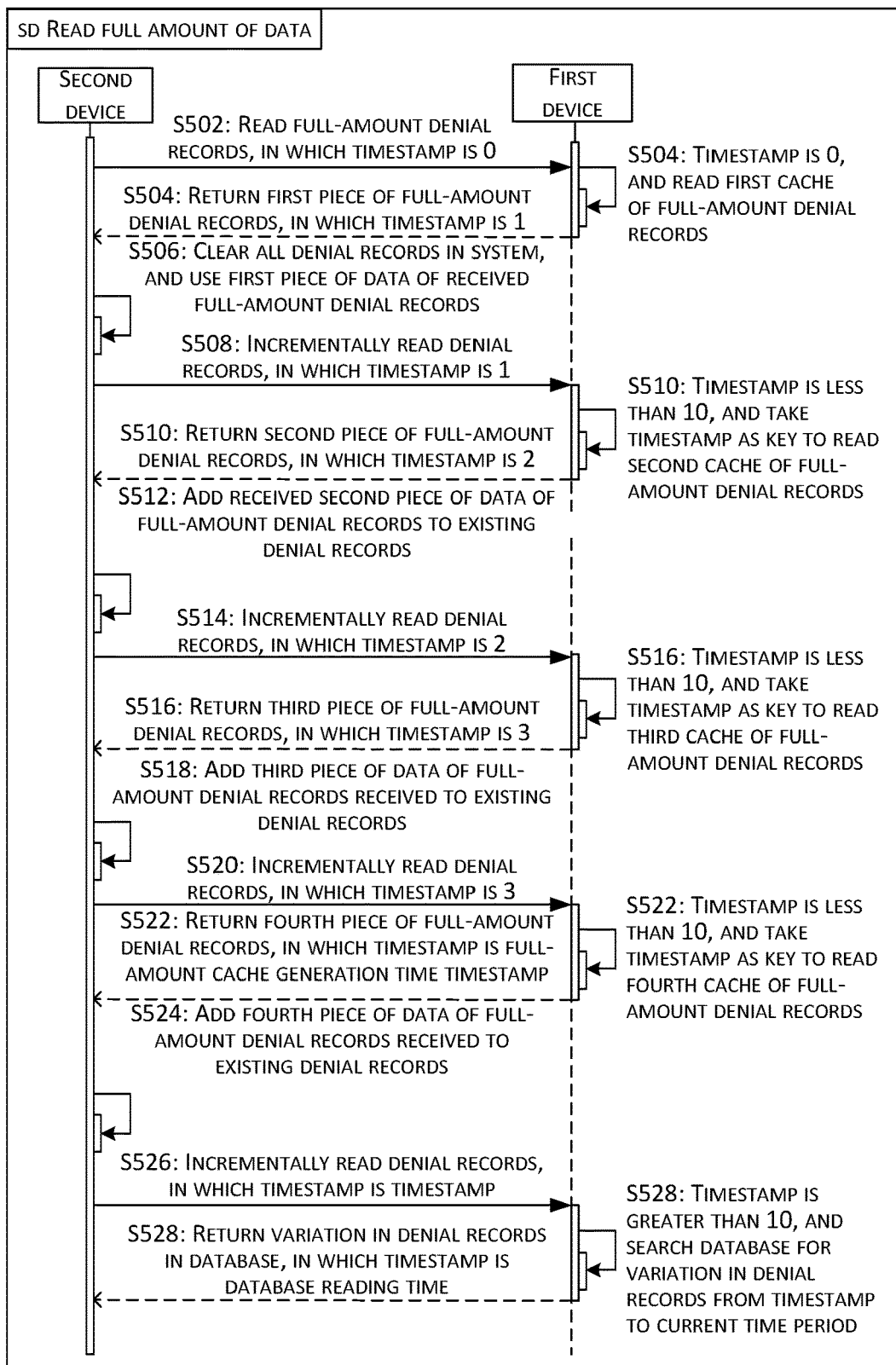
FIG. 5 is a schematic flowchart of a data transmission method according to an optional example embodiment of the present disclosure.

When the second device reads full-amount denial records from the first device, the first device caches existing full-amount denial records and returns the full-amount denial records to the second device in batches, to solve the network problem possibly caused during one-time transmission of a large amount of data and the problem of memory use of the second device. FIG. 5 is a schematic flowchart of a data transmission method according to an optional example embodiment of the present disclosure. As shown in FIG. 5, by taking 4 caches as an example, the method includes the following steps:

Step S502. A second device initiates a request to a first device to read full-amount denial records, a timestamp in the request being 0.

Step S504. The first device determines that the timestamp is 0 indicating updated full-amount denial records, reads fragmented data in the first cache from a cache of full-amount denial records by taking 0 as a key, attaches a timestamp of 1 to the fragmented data, and returns the fragmented data and the timestamp to the second device.

Step S506. The second device clears denial records in the system, and uses fragmented data in the first cache of the received full amount of denial record.

Step S508. One minute later, the second device initiates a request to the first device to read an incremental denial record, in which a timestamp is 1 returned by the first device in step S504.

Step S510. The first device determines that the timestamp is less than 10 indicating incompletely updated full-amount denial records, reads fragmented data in the second cache from the cache of full-amount denial records by taking 1 as a key, attaches a timestamp of 2 to the fragmented data, and returns the fragmented data and the timestamp to the second device.

Step S512. The second device adds the received fragmented data in the second cache to existing denial records.

Step S514. One minute later, the second device initiates a request to the first device to read incremental denial records, in which a timestamp is 2 returned by the first device in step S510.

Step S516. The first device determines that the timestamp is less than 10 indicating incompletely updated full-amount denial records, reads fragmented data in the third cache from the cache of full-amount denial records by taking 2 as a key, attaches a timestamp of 3 to the fragmented data, and returns the fragmented data and the timestamp to the second device.

Step S518. The second device adds the received fragmented data in the third cache to the existing denial records.

Step S520. One minute later, the second device initiates a request to the first device to read incremental denial records, in which a timestamp is 3 returned by the first device in step S516.

Step S522. The first device determines that the timestamp is less than 10 indicating incompletely updated full-amount denial records, reads fragmented data in the fourth cache from the cache of full-amount denial records by taking 3 as a key, attaches to the fragmented data a timestamp which is a generation time timestamp cached in the full-amount denial record, and returns the fragmented data and the timestamp to the second device.

Step S524. The second device adds the received fragmented data in the fourth cache to the existing denial records.

Step S526. One minute later, the second device initiates a request to the first device to read incremental denial records, in which a timestamp is the timestamp returned by the first device in step S522.

Step S528. The first device determines that the timestamp is greater than 10 indicating a normal incremental denial record request, reads a variation in the denial records from the timestamp to the current time in the database, attaches the current time to the variation, and returns the current time and the variation to the second device.

The second device makes an incremental denial record request every minute subsequently. If it is an hour or half an hour, the second device does not make any incremental denial record request, and the procedure returns to perform step S502.

It should be noted that the one minute in the optional example embodiment shown in FIG. 5 of the present disclosure is equivalent to the "regularly" in the example embodiment shown in FIG. 2, the timestamp of 0 is equivalent to that the value of the timestamp in the example embodiment shown in FIG. 2 is a specified value, indicating reading of full-amount denial records. The timestamp of 0, 1, 2, or 3 in the example embodiment is equivalent to the value of the timestamp in the example embodiment shown in FIG. 2, the key is equivalent to the index in the example embodiment shown in FIG. 2, and the timestamp is equivalent to the timestamp whose value is equal to or greater than the preset threshold in the example embodiment shown in FIG. 3.

In the foregoing example embodiment, there are two types of synchronization, i.e., incremental synchronization and full-amount synchronization. Data synchronization by full-amount synchronization is implemented as follows: the full amount of data is fragmented and cached in advance, the data fragmented and cached is used directly when the second device reads the data, that is, synchronization of the full amount of data is achieved by simulating incremental synchronization N times according to the number N of fragments of the full amount of data, which reduces the pressure of data reading, and avoids synchronization failure due to a too large amount of data when the first device synchronizes the data to the second device for the first time.

It should be noted that, for ease of description, the foregoing method example embodiments are all described as a series of action combinations. However, those skilled in the art should understand that the present disclosure is not limited to the described sequence of the actions, because some steps may be performed in another sequence or at the same time according to the present disclosure. In addition, those skilled in the art should also understand that the example embodiments described in this specification are examples, and the involved actions and modules are not necessarily mandatory to the present disclosure.

Based on the foregoing description of the implementation manners, those skilled in the art may clearly understand that the data transmission method according to the foregoing example embodiment may be implemented by software plus a necessary universal hardware platform, and definitely may also be implemented by hardware, and the former is an example implementation manner in most cases. Based on such understanding, the technical solution of the present disclosure essentially, or the portion contributing to the prior art may be embodied in the form of a software product. The computer software product may be stored in a storage medium (such as a ROM/RAM, a magnetic disk, or an optical disc) and include several instructions that enable a terminal device (which may be a mobile phone, a computer, a server, a network device, or the like) to execute the method in the example embodiments of the present disclosure.

Example Embodiment 2

Figure 6:
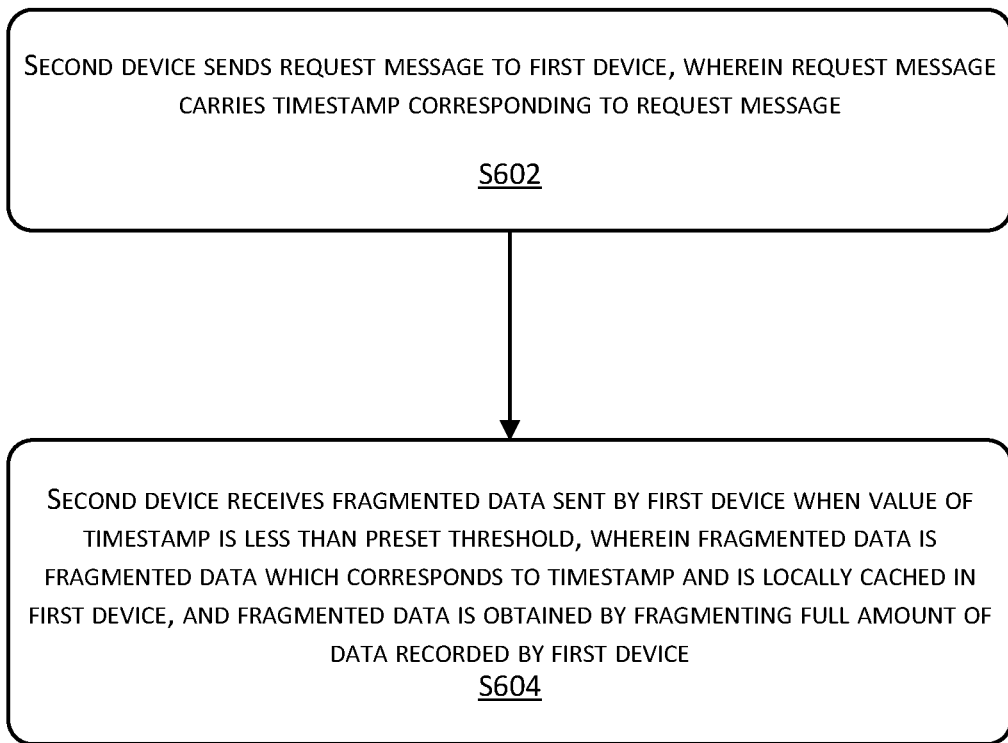
FIG. 6 is a first flowchart of a data transmission method according to Example embodiment 2 of the present disclosure.

According to the example embodiments of the present disclosure, a data transmission method is further provided. FIG. 6 is a first flowchart of a data transmission method according to Example embodiment 2 of the present disclosure. As shown in FIG. 6, the method includes:

Step S602. A second device sends a request message to a first device, wherein the request message carries a timestamp corresponding to the request message.

It should be noted that the second device may be a computer terminal whose structure is the same as that of the computer terminal 100 in Example embodiment 1. The data transmission method in this example embodiment is completed in the environment of the computer terminal but is not limited to this. The sending a request message may be sending the request message regularly, or sending the request message irregularly, which may be, for example, set according to a specific situation.

Step S604. The second device receives fragmented data sent by the first device when the value of the timestamp is less than a preset threshold, wherein the fragmented data is fragmented data which corresponds to the timestamp and is locally cached in the first device, and the fragmented data is obtained by fragmenting the full amount of data recorded by the first device.

The value of the timestamp may be a specified value, for instructing the second device to read the full amount of data in the first device. In an optional example embodiment, the specified value may be 0, that is, when the timestamp carried in the request message is 0, it indicates that the second device should read the full amount of data of the first device. In an optional example embodiment, before step S604, the method further includes: triggering, by the second device, the first device to send the full amount of data when the value of the timestamp is a specified value, and receiving the fragmented data which is sent by the first device and corresponds to the specified value.

It should be noted that the preset threshold may be the number of fragments obtained after the full amount of data is fragmented, and definitely may also be another value. Generally, the preset threshold may be set to be less than 10. The full amount of data may be denial records for a uniform resource locator (URL), may also be denial records for a domain name, and may also be a combination of them, but is not limited to this.

For example, how the first device fragments and caches the full amount of data, that is, how the fragmented data is obtained from the first device, is the same as that in Example embodiment 1. Further details are not described here.

In step S604, the step of receiving, by the second device, fragmented data sent by the first device may be manifested as: receiving, by the second device, specified fragmented data in a local cache of the first device corresponding to an index, wherein the index is the value of the timestamp; and receiving, by the second device, a specified timestamp sent by the first device, wherein the value of the specified timestamp is obtained by adding 1 to the value of the timestamp.

Through the above steps, a second device sends a request message that carries a timestamp, and receives fragmented data in a cache of a first device that corresponds to the timestamp sent by the first device according to the timestamp in the received request message, that is, the second device reads, according to a timestamp, fragmented data cached and fragmented in advance in the first device, which reduces the pressure of data reading, solves the technical problem of frequent failure during full-amount data updating between systems, and improves the efficiency of data transmission.

For example, data records at a level of ten millions are usually recorded in a database of the first device. Here, for ease of understanding, by taking fewer data records (80 data records) as an example, after the second device sends a request message that carries a timestamp whose value is 0, the second device reads the 80 records all at once according to the manner in the related art. In this example embodiment, the first device fragments the 80 records, and the records may be fragmented by equal distribution or unequal distribution. By taking equal distribution as an example, the 80 records are fragmented into 4 parts, and each fragment has 20 records. The data included in each fragment is written into the cache, and indexes corresponding to the 4 pieces of fragmented data in the cache are set to 0, 1, 2, and 3. When the second device requests reading of the full amount of data in the first device, a timestamp carried in a first request is 0, and then the second device reads fragmented data in the cache of the first device that takes 0 as an index. After a period of time (for example, 1 minute), the second device sends a second request. A timestamp carried in the second request is 1, and then the second device reads fragmented data in the cache of the first device that takes 1 as an index. The rest may be done in the same manner, till the second device reads the fragmented data in the cache of the first device completely. That is, in this example embodiment, the first device fragments the full amount of data, and the second device reads the fragmented data in the cache of the first device in batches, which, compared with the solution in the related art, may reduce the pressure of data reading, shorten the time of data transmission, and improve the efficiency of data transmission.

Figure 7:
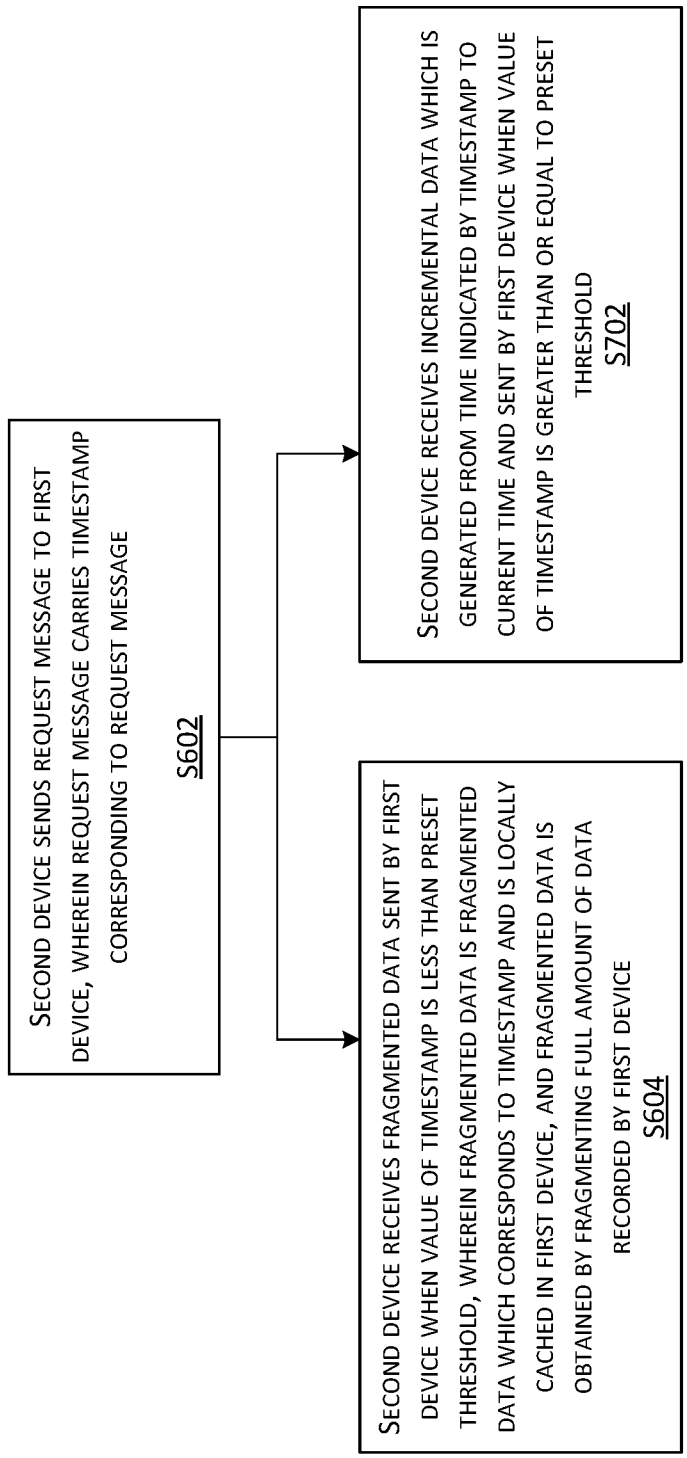
FIG. 7 is a second flowchart of the data transmission method according to Example embodiment 2 of the present disclosure.

In an optional example embodiment, FIG. 7 is a second flowchart of the data transmission method according to Example embodiment 2 of the present disclosure. As shown in FIG. 7, in addition to the steps as shown in FIG. 6, the method further includes:

Step S702. The second device receives incremental data which is generated from the time indicated by the timestamp to the current time and sent by the first device when the value of the timestamp is greater than or equal to the preset threshold.

It should be noted that there are two types of timestamps in the example embodiment of the present disclosure. The first-type timestamp may be the timestamp in the example embodiment shown in FIG. 6, and the timestamp may play a role of index identifier for reading fragmented data in the full amount of data, which may be represented with a single-digit number such as 0, 1, or 2. The second-type timestamp may be a real timestamp, which represents a real time, that is, the time when the second device accesses the first device the last time, and may be represented with a 9-digit number. That is, the second-type timestamp may play a role of identifier and may also represent a real time. As the preset threshold is generally fragmented data, which may not be a large number, the value of the second-type timestamp, which is a real timestamp that may be represented with a 9-digit number, is generally greater than the preset threshold (that is, the timestamp equal to or less than the preset threshold in step S702). Thus, the second-type timestamp may be used as an identifier of the end of one reading of the full amount of data, or an identifier for triggering normal reading of incremental data.

It should be noted that, in step S702, the value of the timestamp is greater than or equal to the preset threshold, indicating that the request sent by the second device is a normal request for reading incremental data, and in this case, incremental data generated from a moment when the second device accesses the first device the last time (i.e., the time indicated by the timestamp) to the current time needs to be transmitted to the second device. In the following time, the second device reads the incremental data always by means of normal incremental synchronization, till the time point is an hour or half an hour, that is, till the second device receives an indication of reading the data by means of full-amount synchronization, and so on.

It should be noted that, in the example embodiment of the present disclosure, data communication between the first device and the second device may use an http protocol but is not limited to this. The method may be applied to the field of network content monitoring and shielding. For example, the first device monitors network content such as content related to pornography, gambling, violence, and terrorism, or another device monitors the content. After the content is monitored, a URL of a webpage corresponding to the content or a domain name of a computer where the content occurs is recorded, and then the data is synchronized to the second device with the method of the example embodiment of the present disclosure. The second device may transmit the data to another device or the second device shields the content according to the obtained URL or domain name.

To better understand the present disclosure, the present disclosure may be further explained in the following with reference to the optional example embodiments shown in FIG. 4 and FIG. 5 in Example embodiment 1. Further details are not described here.

Example Embodiment 3

Figure 8:
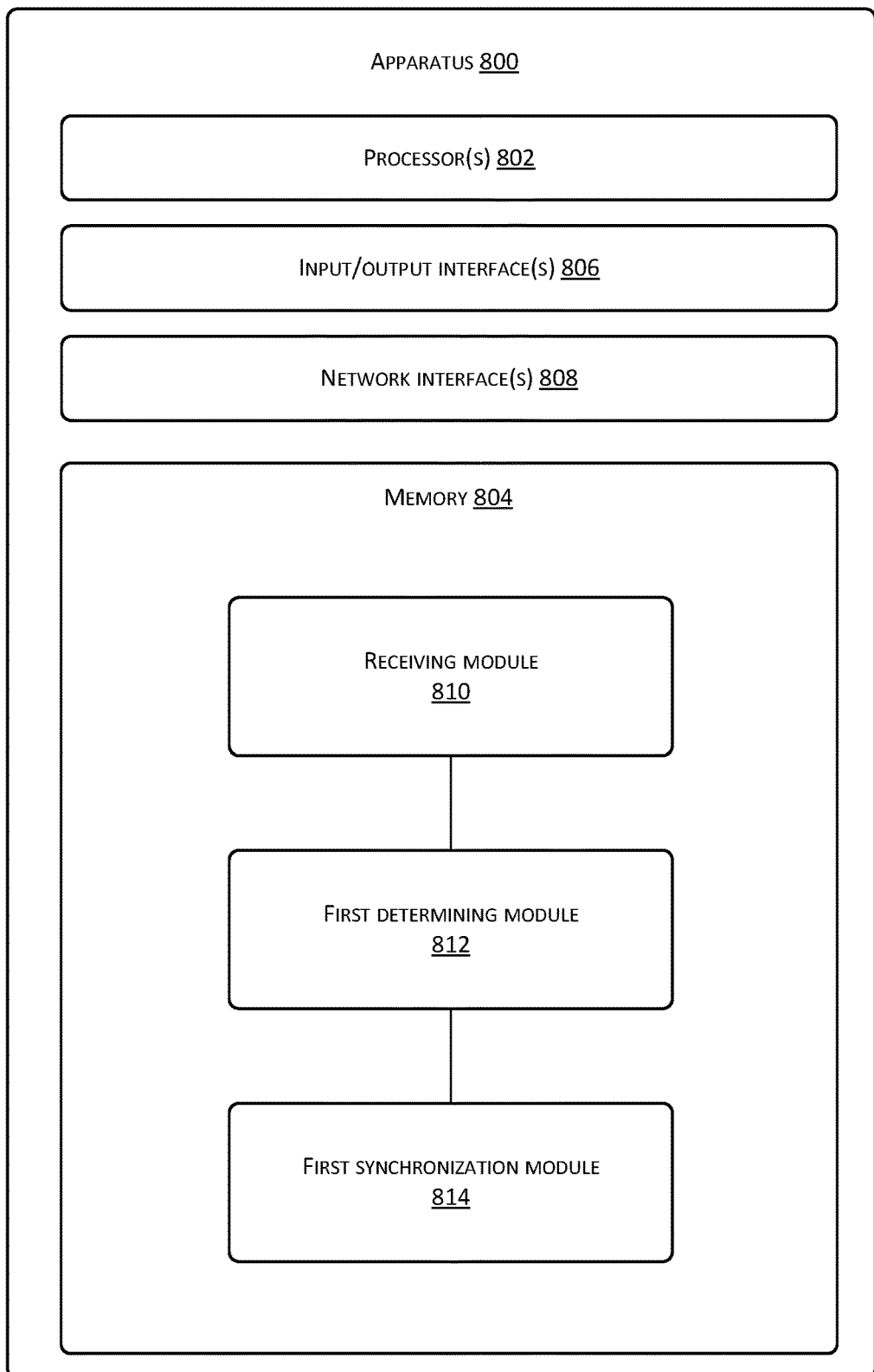
FIG. 8 is a first structural block diagram of a data transmission apparatus according to Example embodiment 3 of the present disclosure.

According to the example embodiments of the present disclosure, an apparatus for implementing the data transmission method in Example embodiment 1 is further provided. FIG. 8 is a first structural block diagram of a data transmission apparatus according to Example embodiment 3 of the present disclosure. As shown in FIG. 8, an apparatus 800 includes one or more processor(s) 802 or data processing unit(s) and memory 804. The apparatus 800 may further include one or more input/output interface(s) 806 and one or more network interface(s) 808. The apparatus 800 is applied to a first device.

The memory 204 is an example of computer readable media.

Computer readable media, including both permanent and non-permanent, removable and non-removable media, may be stored by any method or technology for storage of information. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer-readable media do not include transitory media such as modulated data signals and carriers.

The memory 804 may store therein a plurality of the following modules or units.

The receiving module 810 is configured to receive a request message from a second device regularly, wherein the request message carries a timestamp corresponding to the request message currently received.

It should be noted that the "regularly" in receiving a request message from a second device regularly may be set according to an actual situation. A time interval between any two received request messages may be fixed. For example, it is set that the request message is received once every minute. The request message may also be received at an unfixed time interval. For example, the request message is received for the second time one minute later, and the request message is received for the third time three minutes later. The specific time interval may be set according to actual situations.

The first determining module 812 is connected to the receiving module 810 and is configured to determine whether the value of the timestamp is less than a preset threshold.

The value of the timestamp may be a specified value, for indicating reading of the full amount of data in the first device. In an optional example embodiment, the specified value may be 0. That is, it is indicated that the second device should read the full amount of data in the first device when the value of the timestamp carried in the request message is 0.

The first synchronization module 814 is connected to the first determining module 812, and is configured to synchronize, according to a corresponding relationship between timestamps and fragmented data locally cached by the first device, the fragmented data corresponding to the timestamp to the second device when the value of the timestamp is less than the preset threshold, wherein the fragmented data is obtained by fragmenting the full amount of data recorded by the first device.

Figure 9:
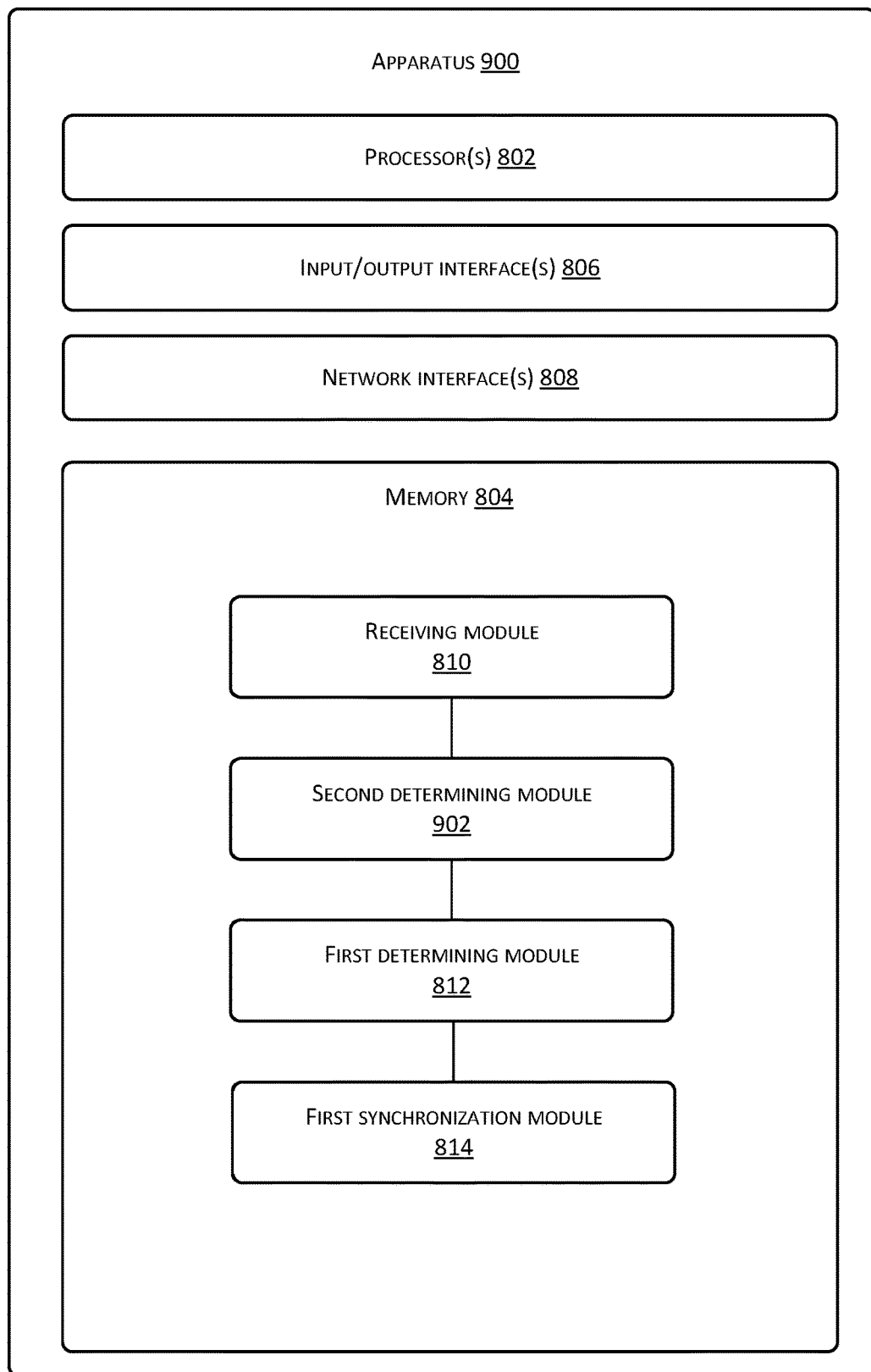
FIG. 9 is a second structural block diagram of the data transmission apparatus according to Example embodiment 3 of the present disclosure.

In an optional example embodiment, FIG. 9 is a second structural block diagram of the data transmission apparatus according to Example embodiment 3 of the present disclosure. As shown in FIG. 9, based on the apparatus 800, an apparatus 900 further includes the following module stored on memory 804:

a second determining module 902 connected to the receiving module 810, configured to determine whether the value of the timestamp is a specified value, wherein the specified value is used to indicate reading of the full amount of data; and trigger synchronization of the fragmented data corresponding to the timestamp to the second device when the determining result is yes.

It should be noted that the preset threshold may be the number of fragments obtained after the full amount of data is fragmented, and definitely may also be another value. Generally, the preset threshold may be set to be less than 10. The full amount of data may be denial records for a uniform resource locator (URL), may also be denial records for a domain name, and may also be a combination of them, but is not limited to this.

The first synchronization module 814 is further configured to synchronize, with the value of the timestamp as an index, specified fragmented data in a local cache of the first device corresponding to the index to the second device.

Figure 10:
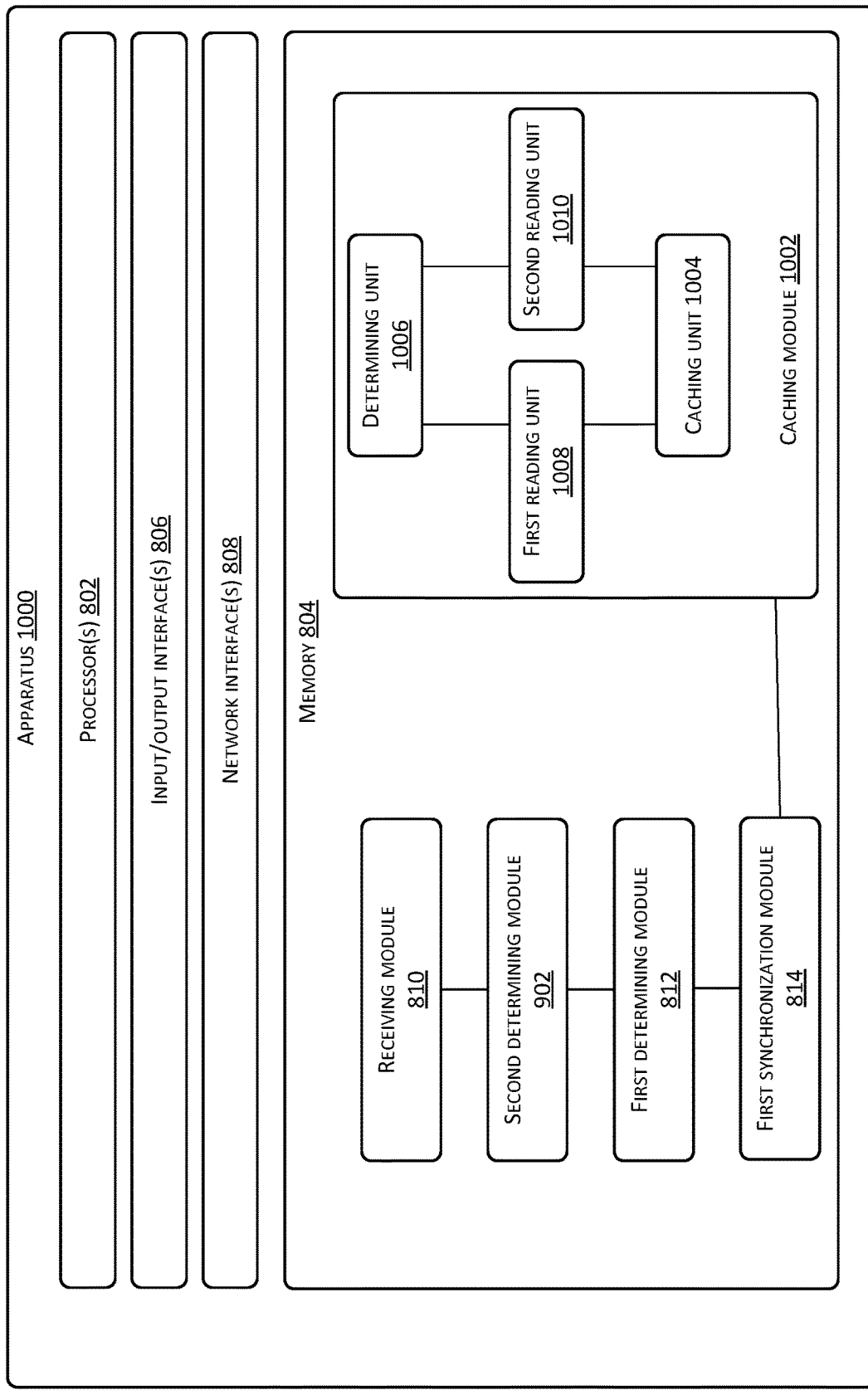
FIG. 10 is a third structural block diagram of the data transmission apparatus according to Example embodiment 3 of the present disclosure.

In an optional example embodiment, FIG. 10 is a third structural block diagram of the data transmission apparatus according to Example embodiment 3 of the present disclosure. As shown in FIG. 10, based on the apparatus 900, an apparatus 1000 further includes the following modules or units stored on memory 804:

a caching module 1002 connected to the first synchronization module 814, configured to write fragmented data in a database of the first device corresponding to a first index n into the local cache, and take n−1 as an index of the fragmented data in the local cache of the first device, wherein n is less than or equal to the total number N of all pieces of the fragmented data obtained after the full amount of data is fragmented, and n and N are both positive integers.

For example, the caching module 1002 further includes:

a determining unit 1004 configured to determine whether n is less than N;

a first reading unit 1006 connected to the determining unit 1004, configured to read the fragmented data corresponding to n from the database when n is less than N, and attach a timestamp whose value is n to the fragmented data corresponding to n;

a second reading unit 1008 connected to the determining unit 1004, configured to read the fragmented data corresponding to n from the database when n is equal to N, and attach a timestamp whose value is a specified moment to the fragmented data corresponding to n, wherein the specified moment is the moment when the second device accessed the first device the last time; and a caching unit 1010 connected to the first reading unit 1006 and the second reading unit 1008, configured to write the fragmented data corresponding to n into the local cache, and take n−1 as an index of the fragmented data in the local cache.

It should be noted that the caching unit 1010 may write the fragmented data corresponding to n according to a sending format. Thus, when the second device needs to read the data, the first device does not need to convert the format of the fragmented data, but directly returns the data to the second device, which reduces the time of synchronization and increases the efficiency of synchronization.

Through the foregoing apparatus, the full amount of data is fragmented and cached, and then according to a timestamp in a received request message, fragmented data corresponding to the timestamp in a cache is synchronized to the second device sequentially based on a relationship between the timestamp and the fragmented data in the cache. As a result, the pressure of data reading is reduced, the technical problem of frequent failure during full-amount data updating between systems is solved, and the efficiency of data transmission is improved.

For example, data records at a level of ten millions are usually recorded in a database of the first device. Here, for ease of understanding, by taking fewer data records (80 data records) as an example, after the first device receives a request message that carries a timestamp whose value is 0, the first device synchronizes the 80 records to the second device all at once according to the manner in the related art. In this example embodiment, the apparatus in the first device fragments the 80 records, and the records may be fragmented by equal distribution or unequal distribution. By taking equal distribution as an example, the 80 records are fragmented into 4 parts, and each fragment has 20 records. The caching unit 1010 writes data included in each fragment into the cache, and sets indexes corresponding to the 4 pieces of fragmented data in the cache to 0, 1, 2, and 3. When the second device requests reading of the full amount of data in the first device, a timestamp carried in a first request is 0, and then the first synchronization module 814 of the first device synchronizes fragmented data in the cache that takes 0 as an index to the second device. After a period of time (for example, 1 minute), the receiving module 810 of the first device receives a second request. A timestamp carried in the second request is 1, and then the first synchronization module 814 of the first device synchronizes fragmented data in the cache that takes 1 as an index to the second device. The rest may be done in the same manner, till the fragmented data in the cache has been completely read. That is, the apparatus in this example embodiment fragments the full amount of data, and synchronizes the fragmented data to the second device sequentially, i.e., the full amount of data is synchronized to the second device in batches, which, compared with the solution in the related art, may reduce the pressure of data reading, shorten the time of data transmission, and improve the efficiency of data transmission.

Figure 11:
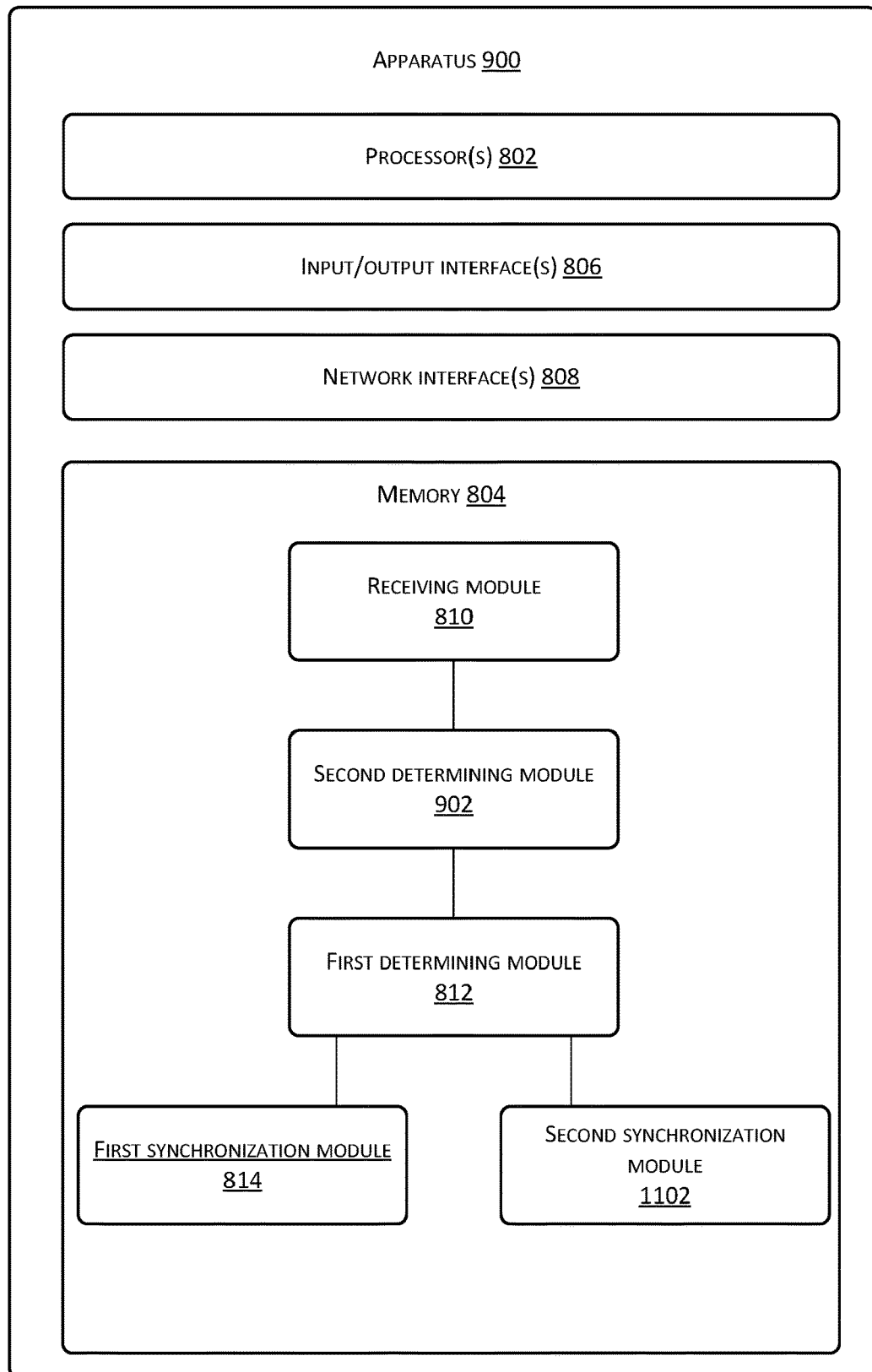
FIG. 11 is a fourth structural block diagram of the data transmission apparatus according to Example embodiment 3 of the present disclosure.

FIG. 11 is a fourth structural block diagram of the data transmission apparatus according to Example embodiment 3 of the present disclosure. A shown in FIG. 11, based on the apparatus 900, an apparatus 1100 further includes the following modules or units stored on memory 804:

a second synchronization module 1102 connected to the first determining module 812, configured to synchronize incremental data generated from the time indicated by the timestamp to the current time to the second device when the value of the timestamp is greater than or equal to the preset threshold.

It should be noted that there are two types of timestamps in the example embodiment of the present disclosure. The first-type timestamp may be the timestamp in the example embodiment shown in FIG. 8, and the timestamp may play a role of index identifier for reading fragmented data in the full amount of data, which may be represented with a single-digit number such as 0, 1 or 2. The second-type timestamp may be a real timestamp, which represents a real time, that is, the time when the second device accesses the first device the last time, and may be represented with a 9-digit number. That is, the second-type timestamp may play a role of identifier and may also represent a real time. As the preset threshold is generally fragmented data, which may not be a large number, the value of the second-type timestamp, which is a real timestamp that may be represented with a 9-digit number, is generally greater than the preset threshold. Thus, the second-type timestamp may be used as an identifier of the end of one reading of the full amount of data, or an identifier for triggering normal reading of incremental data.

It should be noted that the value of the timestamp is greater than or equal to the preset threshold, indicating that the request sent by the second device is a normal request for reading incremental data, and in this case, the second synchronization module 1102 needs to transmit incremental data generated from a moment when the second device accesses the first device the last time (i.e., the time indicated by the timestamp) to the current time to the second device. In the following time, the first device synchronizes the incremental data to the second device always by means of normal incremental synchronization, till the time point is an hour or half an hour, that is, till an indication that the first device synchronizes the data to the second device by means of full amount of synchronization is received, and so on.

It should be noted that, in the example embodiment of the present disclosure, data communication between the first device and the second device may use an http protocol but is not limited to this. The apparatus may be applied to the field of network content monitoring and shielding. For example, the first device monitors network content such as content related to pornography, gambling, violence, and terrorism, or another device monitors the content. After the content is monitored, a URL of a webpage corresponding to the content or a domain name of a computer where the content occurs is recorded, and then the data is synchronized to the second device with the method of the example embodiment of the present disclosure. The second device may transmit the data to another device or the second device shields the content according to the obtained URL or domain name.

It should be noted that the first synchronization module 814 and the second synchronization module 1102 may be the same synchronization module in the first device, and may also be different synchronization modules in the first device.

Example Embodiment 4

Figure 12:
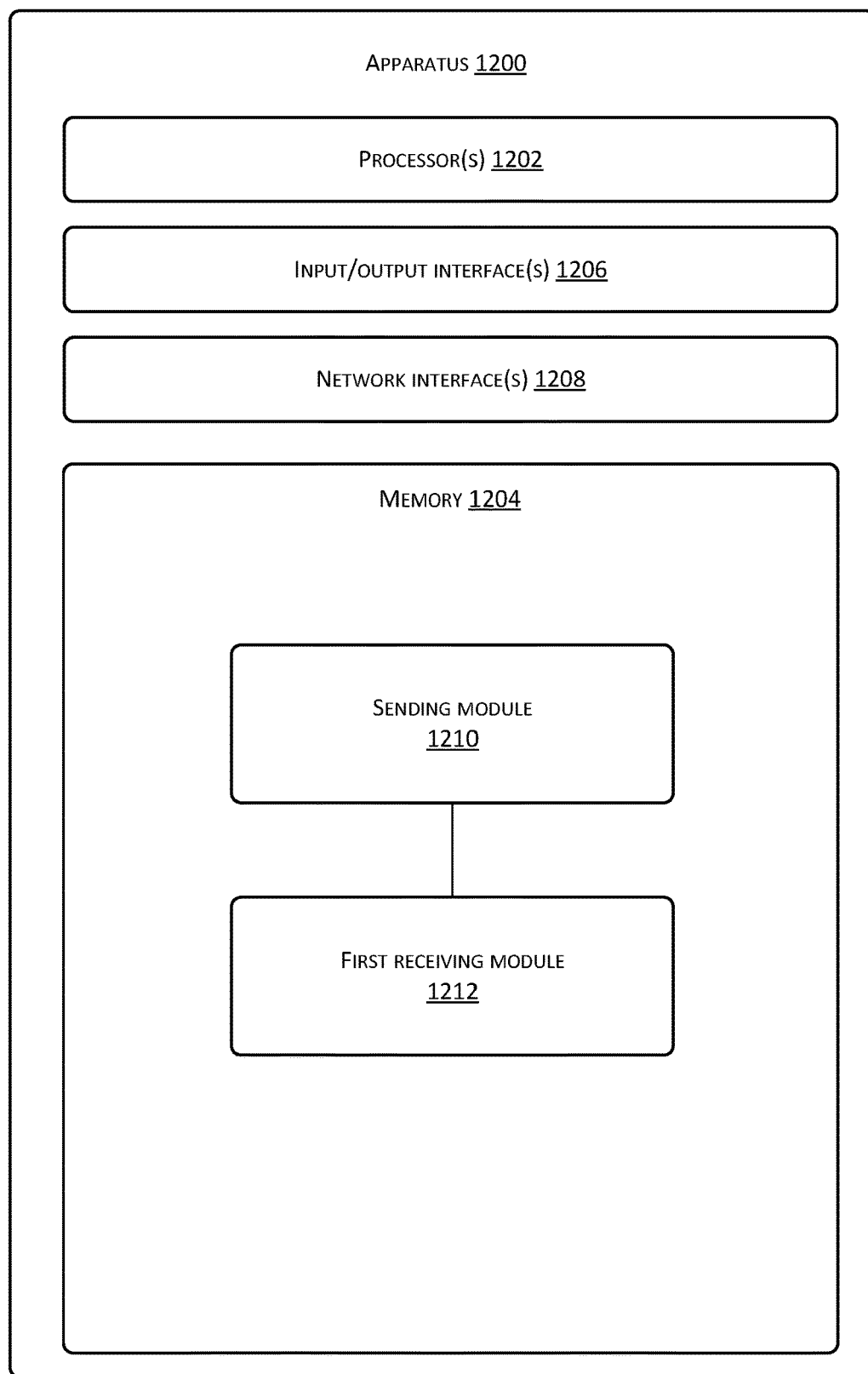
FIG. 12 is a first structural block diagram of a data transmission apparatus according to Example embodiment 4 of the present disclosure.

According to the example embodiments of the present disclosure, an apparatus for implementing the data transmission method in Example embodiment 2 is further provided. FIG. 12 is a first structural block diagram of a data transmission apparatus according to Example embodiment 4 of the present disclosure. As shown in FIG. 12, an apparatus 1200 is applied to a second device. The apparatus 1200 includes one or more processor(s) 1202 or data processing unit(s) and memory 1204. The apparatus 1200 may further include one or more input/output interface(s) 1206 and one or more network interface(s) 1208. The apparatus 1200 is applied to a first device. The memory 1204 is an example of computer readable media.

The memory 1204 may store therein a plurality of modules or units including a sending module 1210 and a first receiving module 1212.

The sending module 1210 is configured to send a request message to a first device, wherein the request message carries a timestamp corresponding to the request message.

It should be noted that the sending a request message may be sending the request message regularly, or sending the request message irregularly, which may be, for example, set according to a specific situation.

The first receiving module 1212 is connected to the sending module 1210, and is configured to receive fragmented data sent by the first device when the value of the timestamp is less than a preset threshold, wherein the fragmented data is fragmented data which corresponds to the timestamp and is locally cached in the first device, and the fragmented data is obtained by fragmenting the full amount of data recorded by the first device.

The value of the timestamp may be a specified value, for instructing the second device to read the full amount of data in the first device. In an optional example embodiment, the specified value may be 0, that is, when the timestamp carried in the request message is 0, it indicates that the second device should read the full amount of data of the first device. In an optional example embodiment, the apparatus further incudes: a triggering module configured to trigger the first device to send the full amount of data when the value of the timestamp is a specified value; and a third receiving module configured to receive the fragmented data which is sent by the first device and corresponds to the specified value, wherein the specified value is used to instruct the second device to read the full amount of data from the first device.

It should be noted that the preset threshold may be the number of fragments obtained after the full amount of data is fragmented, and definitely may also be another value. Generally, the preset threshold may be set to be less than 10. The full amount of data may be denial records for a uniform resource locator (URL), may also be denial records for a domain name, and may also be a combination of them, but is not limited to this.

For example, how the first device fragments and caches the full amount of data, that is, how the fragmented data is obtained from the first device, is the same as that in Example embodiment 1. Further details are not described here.

Figure 13:
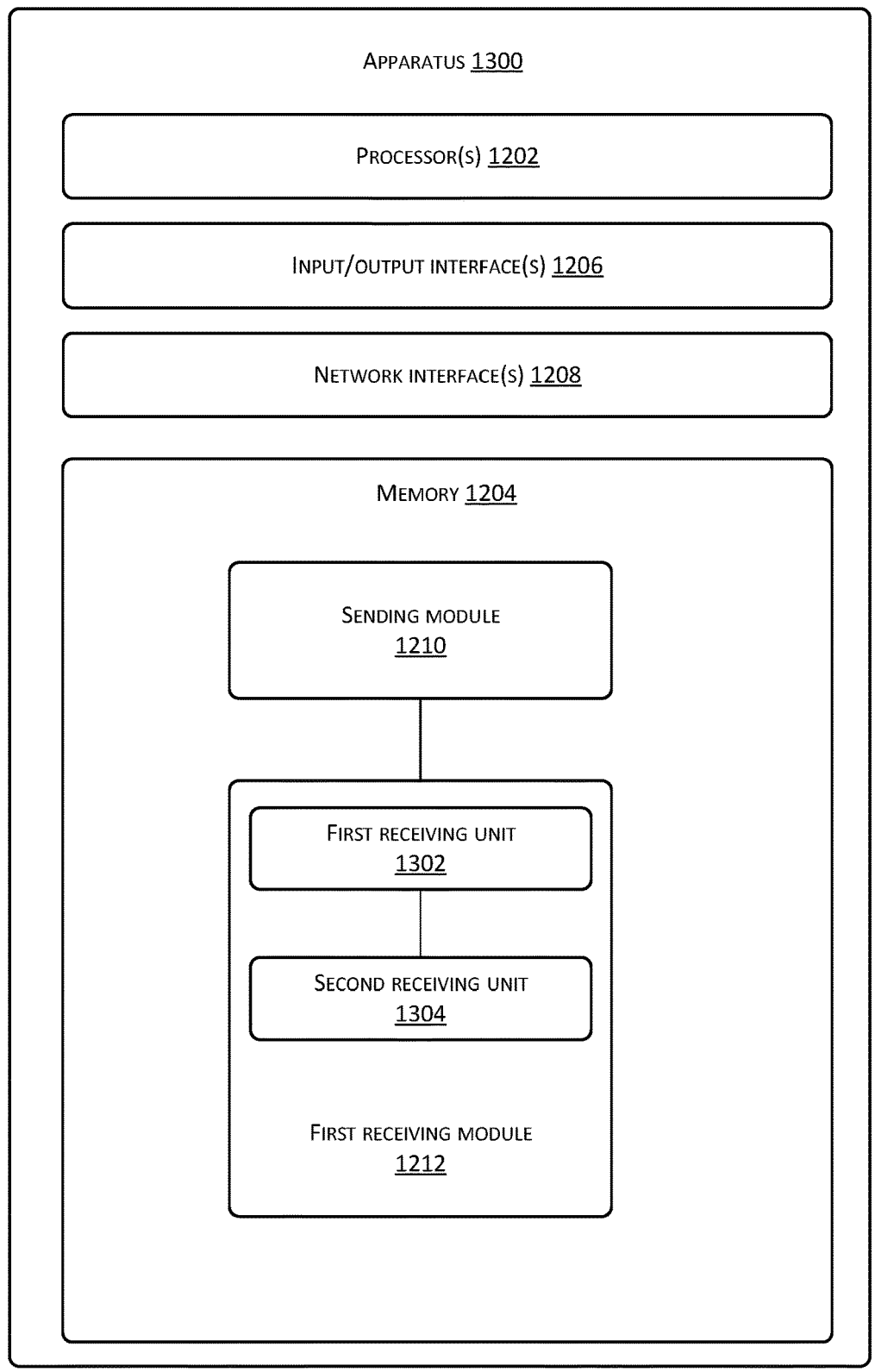
FIG. 13 is a second structural block diagram of the data transmission apparatus according to Example embodiment 4 of the present disclosure.

In an optional example embodiment of the present disclosure, FIG. 13 is a second structural block diagram of a data transmission apparatus 1300 based on the apparatus 1200 according to Example embodiment 4 of the present disclosure. As shown in FIG. 13, the first receiving module 1212 may include: a first receiving unit 1302 configured to receive specified fragmented data in a local cache of the first device corresponding to an index, wherein the index is the value of the timestamp; and a second receiving unit 1304 connected to the first receiving unit 1302, configured to receive a specified timestamp sent by the first device, wherein the value of the specified timestamp is obtained by adding 1 to the value of the timestamp.

Through the foregoing apparatus, a sending module 1210 sends a request message that carries a timestamp, and a first receiving module 1212 receives fragmented data in a cache of a first device that corresponds to the timestamp sent by the first device according to the timestamp in the received request message. That is, the apparatus reads, according to a timestamp, fragmented data cached and fragmented in advance in a first device, which reduces the pressure of data reading, solves the technical problem of frequent failure during full-amount data updating between systems, and improves the efficiency of data transmission.

For example, data records at a level of ten millions are usually recorded in a database of the first device. Here, for ease of understanding, by taking fewer data records (80 data records) as an example, after the second device sends a request message that carries a timestamp whose value is 0, the second device reads the 80 records all at once according to the manner in the related art. In this example embodiment, the first device fragments the 80 records, and the records may be fragmented by equal distribution or unequal distribution. By taking equal distribution as an example, the 80 records are fragmented into 4 parts, and each fragment has 20 records. The data included in each fragment is written into the cache, and indexes corresponding to the 4 pieces of fragmented data in the cache are set to 0, 1, 2, and 3. When the sending module 1210 of the apparatus in the second device requests reading of the full amount of data in the first device, a timestamp carried in a first request is 0, and then the first receiving module 1212 of the apparatus reads fragmented data in the cache of the first device that takes 0 as an index. After a period of time (for example, 1 minute), the sending module 1210 of the apparatus in the second device sends a second request. A timestamp carried in the second request is 1, and then the first receiving module 1212 of the apparatus reads fragmented data in the cache of the first device that takes 1 as an index. The rest may be done in the same manner, till the apparatus in the second device reads the fragmented data in the cache of the first device completely. That is, in this example embodiment, the first device fragments the full amount of data, and the apparatus reads the fragmented data in the cache of the first device in batches, which, compared with the solution in the related art, may reduce the pressure of data reading, shorten the time of data transmission, and improve the efficiency of data transmission.

Figure 14:
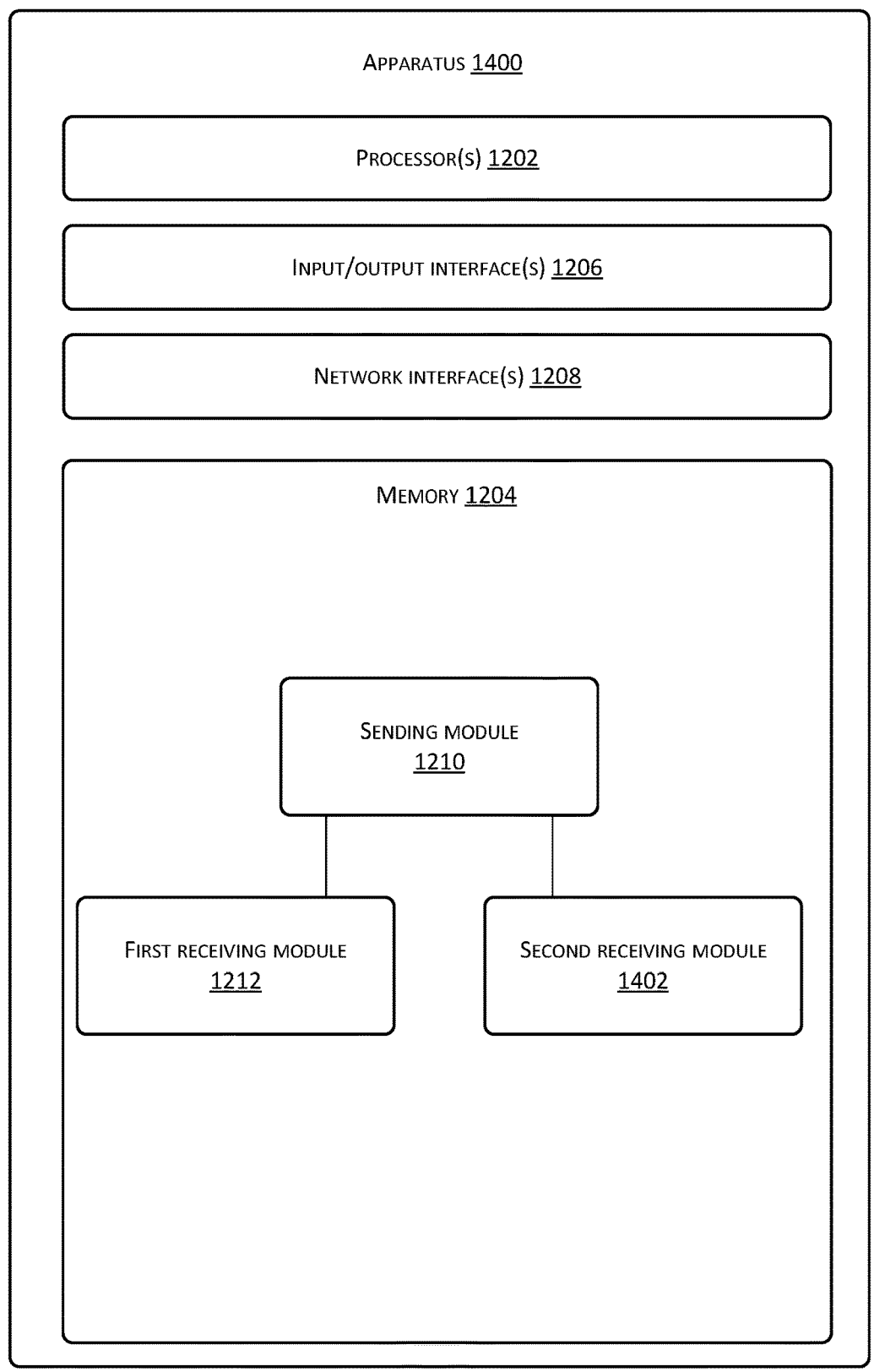
FIG. 14 is a third structural block diagram of the data transmission apparatus according to Example embodiment 4 of the present disclosure.

FIG. 14 is a third structural block diagram of the data transmission apparatus according to Example embodiment 4 of the present disclosure. As shown in FIG. 14, an apparatus 1400 is based on the apparatus 1200 and further includes the following module stored on memory 1204:

a second receiving module 1402 connected to the sending module 1204, configured to receive incremental data which is generated from the time indicated by the timestamp to the current time and sent by the first device when the value of the timestamp is greater than or equal to the preset threshold.

It should be noted that there are two types of timestamps in the example embodiment of the present disclosure. The first-type timestamp may be the timestamp in the example embodiment shown in FIG. 12, and the timestamp may play a role of index identifier for reading fragmented data in the full amount of data, which may be represented with a single-digit number such as 0, 1, or 2. The second-type timestamp may be a real timestamp, which represents a real time, that is, the time when the second device accesses the first device the last time, and may be represented with a 9-digit number. That is, the second-type timestamp may play a role of identifier and may also represent a real time. As the preset threshold is generally fragmented data, which may not be a large number, the value of the second-type timestamp, which is a real timestamp that may be represented with a 9-digit number, is generally greater than the preset threshold. Thus, the second-type timestamp may be used as an identifier of the end of one reading of the full amount of data, or an identifier for triggering normal reading of incremental data.

It should be noted that the value of the timestamp is greater than or equal to the preset threshold, indicating that the request sent by the apparatus in the second device is a normal request for reading incremental data, and in this case, the apparatus in the second device needs to read incremental data generated from a moment when the second device accesses the first device the last time (i.e., the time indicated by the timestamp) to the current time. In the following time, the apparatus reads the incremental data always by means of normal incremental synchronization, till the time point is an hour or half an hour, that is, till the apparatus receives an indication of reading the data by means of full amount of synchronization, and so on.

It should be noted that, in the example embodiment of the present disclosure, data communication between the apparatuses in the first device and the second device may use an http protocol but is not limited to this. The apparatus may be applied to the field of network content monitoring and shielding. For example, the first device monitors network content such as content related to pornography, gambling, violence, and terrorism, or another device monitors the content. After the content is monitored, a URL of a webpage corresponding to the content or a domain name of a computer where the content occurs is recorded, and then the data is synchronized to the second device with the apparatus. The second device may transmit the data to another device or the second device shields the content according to the obtained URL or domain name.

Example Embodiment 5

The example embodiment of the present disclosure may provide a computer terminal. The computer terminal may be any computer terminal device in a computer terminal group. Optionally, in this example embodiment, the computer terminal may also be replaced with a terminal device such as a mobile terminal.

Optionally, in this example embodiment, the computer terminal may be located in at least one of a plurality of network devices in a computer network.

In this example embodiment, the computer terminal may execute program codes of the steps in the data transmission method in Example embodiment 1 of an application. Reference may be made to Example embodiment 1 for details. Further details are not described here.

Figure 15:
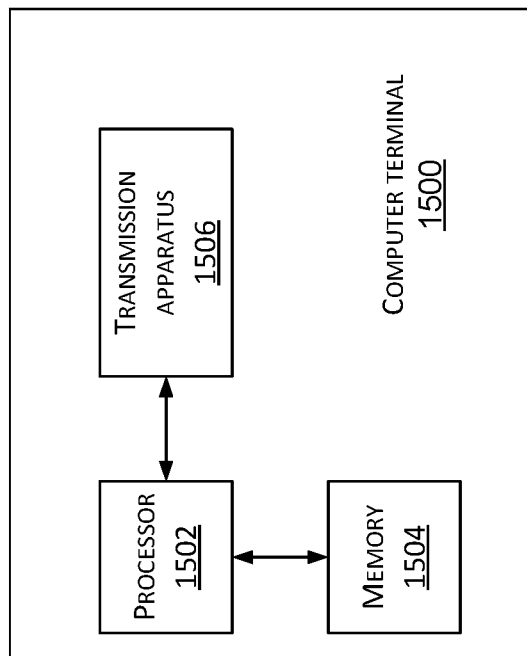
FIG. 15 is a structural block diagram of a computer terminal according to an example embodiment of the present disclosure.

Optionally, FIG. 15 is a structural block diagram of a computer terminal according to an example embodiment of the present disclosure. As shown in FIG. 15, a computer terminal 1500 may include: one or more (only one is shown in the figure) processors 1502, a memory 1504, and a transmission apparatus 1506.

The memory 1504 may be configured to store a software program and module, such as a program instruction/module corresponding to the security vulnerability detection method and apparatus in the example embodiment of the present disclosure. The processor 1502 executes different functional applications and performs data processing by running the software program and module stored in the memory, thereby implementing the method for detecting system vulnerability attacks. The memory 1504 may include a high-speed random memory, and may also include a nonvolatile memory, for example, one or more magnetic storage devices, flash memories or other nonvolatile solid-state memories. In some example embodiments, the memory 1504 may further include memories remotely disposed relative to the processor 1502, and these remote memories 1506 may be connected to the terminal A through a network. Examples of the network include but are not limited to, the Internet, an intranet, a local area network, a mobile communications network, or a combination of them.

The processor 1502 may call the information and applications stored in the memory 1504 by using the transmission apparatus 1408, to execute the application in the steps in Example embodiment 1.

By using the example embodiment of the present disclosure, a solution of a computer terminal is provided. By using the computer terminal, the program codes of the steps in Example embodiment 1 are executed, which reduces the pressure of data reading, solves the technical problem of frequent failure during full-amount data updating between systems, and improves the efficiency of data transmission.

Those of ordinary skill in the art should understand that the structure shown in FIG. 15 is merely schematic, and the computer terminal may also be a terminal device such as a smart phone (such as an Android phone or an iOS phone), a tablet computer, a palmtop computer, a Mobile Internet Device (MID), or a PAD. FIG. 15 does not limit the structure of the electronic device. For example, the computer terminal A may also include more or fewer components (such as a network interface and a display apparatus) than those shown in FIG. 15 or have a configuration different from that shown in FIG. 15.

Those of ordinary skill in the art may understand that all or some of steps in the methods of the above example embodiments may be completed by a program instructing relevant hardware of a terminal device. The program may be stored in a computer readable storage medium. The storage medium may include: a flash disk, a Read-Only Memory (ROM), a Random Access Memory (RAM), a magnetic disk, or an optical disc.

Example Embodiment 6

The example embodiment of the present disclosure may provide a computer terminal. The computer terminal may be any computer terminal device in a computer terminal group. Optionally, in this example embodiment, the computer terminal may also be replaced with a terminal device such as a mobile terminal.

Optionally, in this example embodiment, the computer terminal may be located in at least one of a plurality of network devices in a computer network.

In this example embodiment, the computer terminal may execute program codes of the steps in the data transmission method in Example embodiment 2 of an application. Reference may be made to Example embodiment 2 for details. Further details are not described here.

The structure of the computer terminal in this example embodiment is similar to that of the computer terminal in Example embodiment 5, including a processor, a memory and a transmission apparatus. The memory is configured to store program codes of the steps in the data transmission method in Example embodiment 2. The processor is configured to call the information and applications stored in the memory by using the transmission apparatus, to perform the program codes of the steps in Example embodiment 2. Reference may be made to the method in Example embodiment 2 for specific steps. Further details are not described here.

Example Embodiment 7

The example embodiment of the present disclosure further provides a storage medium. Optionally, in this example embodiment, the storage medium may be configured to store the program codes executed by the data transmission method provided in Example embodiment 1.

Optionally, in this example embodiment, the storage medium may be located in any computer terminal of a computer terminal group in a computer network or located in any mobile terminal of a mobile terminal group.

Optionally, in this example embodiment, the storage medium is configured to store program codes for performing the steps in the data transmission method in Example embodiment 1 or Example embodiment 2. Reference may be made to Example embodiment 1 or Example embodiment 2 for specific steps. Further details are not described here.

The foregoing sequence numbers of the example embodiments of the present disclosure are merely for the convenience of description, and do not imply the preference among the example embodiments.

In the foregoing example embodiments of the present disclosure, the description of each example embodiment has its own focus; for the content that is not detailed in a certain example embodiment, reference may be made to the relevant description of another example embodiment.

In the several example embodiments provided in the present application, it should be understood that the disclosed technical content may be implemented in another manner. The described apparatus example embodiments are only exemplary. For example, division of the unit is merely division of a logical function and division in another manner may exist in actual implementation, for example, a plurality of units or components may be combined or integrated into another system, or some features may be ignored or not performed. In addition, the mutual coupling or direct coupling or communication connections displayed or discussed may be implemented by using some interfaces, and the indirect coupling or communication connections between the units or modules may be implemented electrically or in another form.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the example embodiments.

In addition, functional units in the example embodiments of the present disclosure may be integrated into one processing unit, or each of the units may exist alone physically, or two or more units are integrated into one unit. The integrated unit may be implemented in a form of hardware or may be implemented in a form of a software functional unit.

When the integrated unit is implemented in the form of a software functional unit and sold or used as an independent product, the integrated unit may be stored in a computer-readable storage medium. Based on such understanding, the technical solutions of the present disclosure essentially, or the part that makes contributions to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the example embodiments of the present disclosure. The foregoing storage medium includes: any medium that may store a program code, such as a USB flash drive, a Read-Only Memory (ROM), a Random Access Memory (RAM), a removable hard disk, a magnetic disk, or an optical disc.

The foregoing are only example embodiments of the present disclosure. It should be noted by persons of ordinary skill in the art that several improvements and modifications may be made without departing from the principle of the present disclosure, which should be construed as falling within the protection scope of the present disclosure.

The present disclosure may further be understood with clauses as follows.

Clause 1. A data transmission method comprising:
receiving, by a first device, a request message from a second device regularly, wherein the request message carries a timestamp corresponding to the request message that is currently received;
determining, by the first device, whether a value of the timestamp is less than a preset threshold; and
synchronizing, by the first device according to a corresponding relationship between timestamps and fragmented data locally cached by the first device, the fragmented data corresponding to the timestamp to the second device when the value of the timestamp is less than the preset threshold, wherein the fragmented data is obtained by fragmenting full amount of data recorded by the first device.

Clause 2. The method of clause 1, further comprising:
synchronizing, by the first device, incremental data generated from a time indicated by the timestamp to a current time to the second device when the value of the timestamp is greater than or equal to the preset threshold.

Clause 3. The method of clause 1, wherein before the determining, by the first device, whether the value of the timestamp is less than the preset threshold, the method further comprises:
determining, by the first device, whether the value of the timestamp is a specified value, wherein the specified value is used to indicate reading of the full amount of data; and triggering synchronization of the fragmented data corresponding to the timestamp to the second device when a determining result is yes.

Clause 4. The method of clause 1, wherein the synchronizing the fragmented data corresponding to the timestamp to the second device comprises:
synchronizing, by the first device by using the value of the timestamp as an index, specified fragmented data in a local cache of the first device corresponding to the index to the second device.

Clause 5. The method of clause 1, wherein the fragmented data is obtained from the first device in the following manner:
writing, by the first device, fragmented data in a database of the first device corresponding to a first index n into a local cache, and taking n−1 as an index of the fragmented data in the local cache of the first device, wherein n is less than or equal to the total number N of all pieces of the fragmented data obtained after the full amount of data is fragmented, and n and N are both positive integers.

Clause 6. The method of clause 5, wherein the writing, by the first device, fragmented data in the database of the first device corresponding to the first index n into the local cache, and taking n−1 as the index of the fragmented data in the local cache of the first device comprises:
determining, by the first device, whether n is less than N;
reading, by the first device, the fragmented data corresponding to n from the database when n is less than N, and attaching a timestamp whose value is n to the fragmented data corresponding to n;
reading, by the first device, the fragmented data corresponding to n from the database when n is equal to N, and attaching a timestamp whose value is a specified time to the fragmented data corresponding to n, wherein the specified time is a time when the second device accessed the first device the last time; and
writing, by the first device, the fragmented data corresponding to n into the local cache, and taking n−1 as an index of the fragmented data in the local cache.

Clause 7. The method of any of clauses 1 to 6, wherein the full amount of data comprises at least one of the following: denial records for a uniform resource locator, and denial records for a domain name.

Clause 8. A data transmission method comprising:
sending, by a second device, a request message to a first device, wherein the request message carries a timestamp corresponding to the request message; and
receiving, by the second device, fragmented data sent by the first device when a value of the timestamp is less than a preset threshold, wherein the fragmented data is fragmented data that corresponds to the timestamp and is locally cached in the first device, and the fragmented data is obtained by fragmenting full amount of data recorded by the first device.

Clause 9. The method of clause 8, further comprising:
receiving, by the second device, incremental data which is generated from a time indicated by the timestamp to a current time and sent by the first device when the value of the timestamp is greater than or equal to the preset threshold.

Clause 10. The method of clause 8, wherein before receiving, by the second device, the fragmented data sent by the first device, wherein the fragment data corresponds to the timestamp and is locally cached by the first device, the method further comprises:

triggering, by the second device, the first device to send the full amount of data when the value of the timestamp is a specified value, and receiving the fragmented data which is sent by the first device and corresponds to the specified value, wherein the specified value is used to instruct the second device to read the full amount of data from the first device.

Clause 11. The method of clause 8, wherein the receiving, by the second device, fragmented data sent by the first device comprises:

receiving, by the second device, specified fragmented data in a local cache of the first device corresponding to an index, wherein the index is the value of the timestamp; and receiving, by the second device, a specified timestamp sent by the first device, wherein the value of the specified timestamp is obtained by adding 1 to the value of the timestamp.

Clause 12. The method of any of clauses 8 to 11, wherein the full amount of data comprises at least one of the following: a denial record for a uniform resource locator, and a denial record for a domain name.

Clause 13. A data transmission apparatus applied to a first device, the data transmission apparatus comprising:

a receiving module configured to receive a request message from a second device regularly, wherein the request message carries a timestamp corresponding to the request message currently received;

a first determining module configured to determine whether the value of the timestamp is less than a preset threshold; and a first synchronization module configured to synchronize, according to a corresponding relationship between timestamps and fragmented data locally cached by the first device, fragmented data corresponding to the timestamp to the second device when the value of the timestamp is less than the preset threshold, wherein the fragmented data is obtained by fragmenting full amount of data recorded by the first device.

Clause 14. The apparatus of clause 13, further comprising:

a second synchronization module configured to synchronize incremental data generated from a time indicated by the timestamp to a current time to the second device when the timestamp is greater than or equal to the preset threshold.

Clause 15. The apparatus of clause 13, further comprising:

a second determining module configured to determine whether the value of the timestamp is a specified value, wherein the specified value is used to indicate reading of the full amount of data; and trigger synchronization of the fragmented data corresponding to the timestamp to the second device when a determining result is yes.

Clause 16. The apparatus of clause 13, wherein the first synchronization module is further configured to synchronize, with the value of the timestamp as an index, specified fragmented data in a local cache of the first device corresponding to the index to the second device.

Clause 17. The apparatus of clause 13, further comprising:

a caching module configured to write fragmented data in a database of the first device corresponding to a first index n into the local cache, and take n−1 as an index of the fragmented data in the local cache of the first device, wherein n is less than or equal to the total number N of all pieces of the fragmented data obtained after the full amount of data is fragmented, and n and N are both positive integers.

Clause 18. The apparatus of clause 17, wherein the caching module comprises:

a determining unit configured to determine whether n is less than N;

a first reading unit configured to read the fragmented data corresponding to n from the database when n is less than N, and attach a timestamp whose value is n to the fragmented data corresponding to n;

a second reading unit configured to read the fragmented data corresponding to n from the database when n is equal to N, and attach a timestamp whose value is a specified moment to the fragmented data corresponding to n, wherein the specified moment is the moment when the second device accessed the first device the last time; and a caching unit configured to write the fragmented data corresponding to n into the local cache, and take n−1 as an index of the fragmented data in the local cache.

Clause 19. The apparatus of any of clauses 13 to 18, wherein the full amount of data comprises at least one of the following: a denial record for a uniform resource locator, and a denial record for a domain name.

Clause 20. A data transmission apparatus applied to a second device, the data transmission apparatus comprising:

a sending module configured to send a request message to a first device, wherein the request message carries a timestamp corresponding to the request message; and a first receiving module configured to receive fragmented data sent by the first device when the value of the timestamp is less than a preset threshold, wherein the fragmented data is fragmented data which corresponds to the timestamp and is locally cached in the first device, and the fragmented data is obtained by fragmenting full amount of data recorded by the first device.

Clause 21. The apparatus of clause 20, further comprising:

a second receiving module configured to receive incremental data which is generated from a time indicated by the timestamp to a current time and sent by the first device when the value of the timestamp is greater than or equal to the preset threshold.

Clause 22. The apparatus of clause 20, further comprising:

a triggering module configured to trigger the first device to send the full amount of data when the value of the timestamp is a specified value; and a third receiving module configured to receive the fragmented data which is sent by the first device and corresponds to the specified value, wherein the specified value is used to instruct the second device to read the full amount of data from the first device.

Clause 23. The apparatus of clause 20, wherein the first receiving module comprises:

a first receiving unit configured to receive specified fragmented data in a local cache of the first device corresponding to an index, wherein the index is the value of the timestamp; and a second receiving unit configured to receive a specified timestamp sent by the first device, wherein the value of the specified timestamp is obtained by adding 1 to the value of the timestamp.

Clause 24. The apparatus of any of clauses 20 to 23, wherein the full amount of data comprises at least one of the following: a denial record for a uniform resource locator, and a denial record for a domain name.

What is claimed is:

1. A method performed by a first device, the method comprising:
   receiving a request message from a second device, the request message carrying a timestamp corresponding to the request message;
   determining a value of the timestamp;
   obtaining fragmented data by fragmenting full amount of data recorded by the first device according to the value of the timestamp; and
   in response to determining that the value of the timestamp is a specified value, the specified value being used to indicate reading of the full amount of data:
      synchronizing the fragmented data corresponding to the timestamp to the second device, and
   in response to determining that the value of the timestamp is less than a preset threshold:
      synchronizing the fragmented data corresponding to the timestamp to the second device according to a corresponding relationship between timestamps and fragmented data locally cached by the first device.

2. The method of claim 1, further comprising:
   synchronizing incremental data generated from a time indicated by the timestamp to a current time to the second device, in response to determining that the value of the timestamp is greater than or equal to the preset threshold.

3. The method of claim 1, wherein the synchronizing the fragmented data corresponding to the timestamp to the second device comprises:
   synchronizing, by using the value of the timestamp as an index, specified fragmented data in a local cache of the first device corresponding to the index to the second device.

4. The method of claim 1, wherein obtaining the fragmented data comprises:
   writing the fragmented data in a database of the first device corresponding to a first index n into a local cache, and using n−1 as an index of the fragmented data in the local cache of the first device, wherein n is less than or equal to a total number N of all pieces of the fragmented data obtained after the full amount of data is fragmented, and n and N are both positive integers.

5. The method of claim 4, wherein writing the fragmented data in the database of the first device corresponding to the first index n into the local cache, and using n−1 as the index of the fragmented data in the local cache of the first device comprises:
   determining whether n is less than N;
   reading the fragmented data corresponding to n from the database when n is less than N, and attaching a timestamp whose value is n to the fragmented data corresponding to n;
   reading the fragmented data corresponding to n from the database when n is equal to N, and attaching a timestamp whose value is a specified time to the fragmented data corresponding to n, wherein the specified time is a time when the second device accessed the first device at a last time; and
   writing the fragmented data corresponding to n into the local cache and using n−1 as an index of the fragmented data in the local cache.

6. The method of claim 1, wherein the full amount of data comprises at least one:
   denial records for a uniform resource locator, or
   denial records for a domain name.

7. A method performed by a second device, the method comprising:
   sending a request message to a first device, the request message carrying a timestamp corresponding to the request message;
   determining a value of the time stamp; and
   receiving fragmented data sent by the first device when the value of the timestamp is less than a preset threshold, the fragmented data being fragmented data corresponding to the timestamp, being locally cached in the first device corresponding to an index wherein the index is the value of the timestamp, and being fragment of full amount of data recorded by the first device according to the value of the timestamp,
   wherein a specified timestamp corresponding to the fragmented data is obtained by adding 1 to the value of the timestamp.

8. The method of claim 7, further comprising:
   receiving incremental data which is generated from a time indicated by the timestamp to a current time and sent by the first device when the value of the timestamp is greater than or equal to the preset threshold.

9. The method of claim 7, wherein before receiving the fragmented data sent by the first device, the method further comprises:
   triggering the first device to send the full amount of data when the value of the timestamp is a specified value; and
   receiving the fragmented data which is sent by the first device and corresponds to the specified value, wherein the specified value is used to instruct the second device to read the full amount of data from the first device.

10. The method of claim 7, wherein the full amount of data comprises at least one:
    a denial record for a uniform resource locator, or a denial record for a domain name.

11. An apparatus comprising:
    one or more processors; and
    one or more memories storing thereon computer-readable instructions that, when executed by the one or more processors, cause the one or more processors to perform acts comprising:
       receiving, by a first device, a request message from a second device, the request message carrying a timestamp corresponding to the request message;
       determining a value of the timestamp;
       obtaining, by the first device, fragmented data by fragmenting full amount of data recorded by the first device according to the value of the timestamp; and
       in response to determining that the value of the timestamp is a specified value, the specified value being used to indicate reading of the full amount of data:
          synchronizing the fragmented data corresponding to the timestamp to the second device, and
       in response to determining that the value of the timestamp is less than a preset threshold:
          synchronizing, by the first device according to a corresponding relationship between timestamps and fragmented data locally cached by the first device.

12. The apparatus of claim 11, wherein the acts further comprise:
    synchronizing, by the first device, incremental data generated from a time indicated by the timestamp to a current time to the second device, in response to determining that the value of the timestamp is greater than or equal to the preset threshold.

13. The apparatus of claim 11, wherein the synchronizing the fragmented data corresponding to the timestamp to the second device comprises:

synchronizing, by the first device by using the value of the timestamp as an index, specified fragmented data in a local cache of the first device corresponding to the index to the second device.

14. The apparatus of claim 11, wherein obtaining the fragmented data comprises:

writing, by the first device, fragmented data in a database of the first device corresponding to a first index n into a local cache, and using n−1 as an index of the fragmented data in the local cache of the first device, wherein n is less than or equal to a total number N of all pieces of the fragmented data obtained after the full amount of data is fragmented, and n and N are both positive integers.

15. The apparatus of claim 14, wherein writing, by the first device, the fragmented data in the database of the first device corresponding to the first index n into the local cache, and using n−1 as the index of the fragmented data in the local cache of the first device comprises:

determining, by the first device, whether n is less than N;
reading, by the first device, the fragmented data corresponding to n from the database when n is less than N, and attaching a timestamp whose value is n to the fragmented data corresponding to n;
reading, by the first device, the fragmented data corresponding to n from the database when n is equal to N, and attaching a timestamp whose value is a specified time to the fragmented data corresponding to n, wherein the specified time is a time when the second device accessed the first device at a last time; and
writing, by the first device, the fragmented data corresponding to n into the local cache and using n−1 as an index of the fragmented data in the local cache.

16. The apparatus of claim 11, wherein the full amount of data comprises at least one:

denial records for a uniform resource locator, or
denial records for a domain name.

* * * * *